(12) United States Patent
Matsushima

(10) Patent No.: US 11,192,247 B2
(45) Date of Patent: Dec. 7, 2021

(54) ROBOT CONTROLLER FOR CONTROLLING ARC MOTION OF ROBOT

(71) Applicant: FANUC CORPORATION, Yamanashi (JP)

(72) Inventor: Tomonori Matsushima, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 180 days.

(21) Appl. No.: 16/555,334

(22) Filed: Aug. 29, 2019

(65) Prior Publication Data

US 2020/0101607 A1    Apr. 2, 2020

(30) Foreign Application Priority Data

Sep. 27, 2018  (JP) .............................. JP2018-182851

(51) Int. Cl.
| | |
|---|---|
| *B25J 9/16* | (2006.01) |
| *G05B 19/41* | (2006.01) |
| *G05B 19/4103* | (2006.01) |
| *B23K 9/12* | (2006.01) |
| *G05B 19/42* | (2006.01) |

(52) U.S. Cl.
CPC .............. *B25J 9/1664* (2013.01); *B23K 9/12* (2013.01); *G05B 19/4103* (2013.01); *G05B 19/42* (2013.01)

(58) Field of Classification Search
CPC ................ B23K 26/0884; B23K 9/032; B23K 37/0282; B23K 9/12; G05B 19/42; G05B 19/4103; G05B 2219/34149; B25J 9/1664
See application file for complete search history.

(56) References Cited

U.S. PATENT DOCUMENTS

| | | | | |
|---|---|---|---|---|
| 5,845,053 A | * | 12/1998 | Watanabe ................ | B23K 9/16 700/262 |
| 6,167,328 A | * | 12/2000 | Takaoka ................ | B25J 9/1671 318/568.1 |
| 2006/0030970 A1 | * | 2/2006 | Watanabe ............ | G05B 19/425 700/248 |

(Continued)

FOREIGN PATENT DOCUMENTS

| | | |
|---|---|---|
| JP | S60230207 A | 11/1985 |
| JP | S62-285110 A | 12/1987 |

(Continued)

*Primary Examiner* — Stephen Holwerda
(74) *Attorney, Agent, or Firm* — Hauptman Ham, LLP

(57) ABSTRACT

A robot controller controls an arc motion of a robot. The robot controller includes an interpolation point setting unit that sets an interpolation point between movement points in an operation program. The robot controller includes a movement-point angle calculation unit that calculates an angle relating to a reference direction for determining the orientation of the robot, and an interpolation-point angle calculation unit that calculates an angle relating to the reference direction at an interpolation point by interpolating angles relating to the reference direction at the movement points. The reference direction is a direction independent from the positions of the movement points and is set in an operation program in a predetermined coordinate system.

8 Claims, 24 Drawing Sheets

(56) References Cited

U.S. PATENT DOCUMENTS

2016/0151913 A1* 6/2016 Nagatsuka ............. B25J 9/1664
                                                    700/251
2017/0087717 A1* 3/2017 Hirayama ............ G05B 19/427
2017/0371326 A1* 12/2017 Okazaki ............... B23K 9/0953

FOREIGN PATENT DOCUMENTS

| JP | H1230105 A | 9/1989 |
| JP | H8123536 A | 5/1996 |
| JP | 2001-96367 A | 4/2001 |
| JP | 201235308 A | 2/2012 |
| JP | 2013-215862 A | 10/2013 |

* cited by examiner

FIG. 7

```
1:J P[1] 100% FINE    ;
2:ORNTBASE UF[1, Z]
3:C P[2]
    P[3] 500mm/sec CNT100;
4:C P[4]
    P[5] 500mm/sec CNT100;
5:ORNTBASE END
```

FIG. 8

```
UF[1][
    X =  1807.000  mm, Y =     0.000 mm, Z =  1300.000  mm,
    W =   180.000 deg  P =   -90.000 deg, R =     0.000 deg
];
```

FIG. 12

```
1:J P[1] 100% FINE    ;
2:C P[2]
    P[3] 500mm/sec CNT100 ORNTBASE UF[1, X];
3:C P[4]
    P[5] 500mm/sec CNT100 ORNTBASE REF[1, Z];
```
46b

FIG. 13

```
REF[1][
    X =  1807.000  mm, Y =     0.000  mm, Z =  1300.000  mm,
    W =   180.000 deg, P =   -90.000 deg, R =     0.000 deg
];
```
47b

FIG. 14

```
LEADER[1][
    X =  1807.000  mm, Y =     0.000  mm, Z =  1300.000  mm,
    W =   180.000 deg  P =   -90.000 deg, R =     0.000 deg
];
```
47c

ROBOT CONTROLLER FOR CONTROLLING ARC MOTION OF ROBOT

RELATED APPLICATIONS

The present application claims priority of Japanese Application Number 2018-182851, filed Sep. 27, 2018, the disclosure of which is hereby incorporated by reference herein in its entirety.

BACKGROUND OF THE INVENTION

1. Field of the Invention

The present invention relates to a robot controller for controlling an arc motion of a robot.

2. Description of the Related Art

A robot device includes a robot, an operation tool attached to the robot, and a controller that controls the robot. The controller drives the robot and the operation tool based on an operation program.

An operator can teach teaching points in advance in order to determine the position and orientation of the robot. The position and orientation of the robot at a teaching point can be stored as a movement point in the operation program. At the movement point, the robot is controlled to a position and an orientation that are set in the operation program (for example, see Japanese Unexamined Patent Publication No. 2013-215862A and Japanese Unexamined Patent Publication No. 2001-96367A).

The operator can set, in the operation program, method of interpolating the positions and orientations of the robot in a section between movement points. As methods of interpolation in a section between movement points, linear interpolation for a straight-line motion and circular interpolation for an arc motion are known. In a straight-line motion, a tool center point moves on a linear path. In an arc motion, the tool center point moves on an arc-shaped path. In circular interpolation, the controller calculates an arc-shaped movement path based on a plurality of movement points. The controller controls the position and orientation of the robot so as to move the tool center point on the arc-shaped movement path (for example, see Japanese Unexamined Patent Publication No. S62-285110A).

SUMMARY OF THE INVENTION

When an arc motion of the robot is performed, a start point, a via point, and an end point are specified from a plurality of movement points in the operation program. The controller controls the robot so as to drive the robot along the arc-shaped path that is calculated so as to pass through the three points.

In a section between the movement points, the controller interpolates the positions of the robot at the movement points, thereby calculating the position of the robot at an interpolation point. Regarding the orientation of the robot, the controller calculates the normal direction of a reference plane as a reference direction, the reference plane being formed by the start point, the via point, and the end point. The controller calculates the orientation of the robot relating to the reference direction at the movement point. The controller interpolates the orientations of the robot relating to the reference direction in a section between the movement points. By adopting this control, the controller can calculate the orientation of the robot relating to the reference direction at an interpolation point.

However, if the orientation of the robot is calculated based on the normal direction of the reference plane passing through the three movement points, the position of the robot is corrected so as to change the inclination of the reference plane. In this case, although the orientations of the robot are not changed at the movement points, the orientation of the operation tool may become unstable and sways.

The orientation of the robot corresponds to the orientation of the operation tool. For example, in the case of welding such as arc welding, the orientation of the robot is significant in order to ensure the quality of welding. If the orientation of the operation tool sways, the quality of welding may be deteriorated.

Moreover, the reference plane passing through the three movement points is calculated by the controller, preventing the operator from visually checking the reference plane. Thus, it is difficult for the operator to correct the orientation of the robot when the position of the robot is changed. In the related art, teaching points are narrowly spaced in order to prevent the operation tool from swaying. This increases the number of teaching points, leading to low working efficiency.

A robot controller according to an aspect of the present disclosure controls an arc motion of a robot. The robot controller includes a storage unit that stores an operation program that determines the position and orientation of the robot at a predetermined movement point. The robot controller includes an interpolation point setting unit that sets an interpolation point between movement points. The robot controller includes a movement-point angle calculation unit that calculates, at the movement point, an angle relating to a reference direction for determining the orientation of the robot based on the orientation of the robot, and an interpolation-point angle calculation unit that calculates an angle relating to the reference direction at an interpolation point by interpolating angles relating to the reference direction at the movement points. The robot controller includes an orientation calculation unit that calculates the orientation of the robot at the interpolation point based on the angle relating to the reference direction at the interpolation point. The reference direction is a direction independent from the positions of the movement points and is set in an operation program in a predetermined coordinate system.

BRIEF DESCRIPTION OF THE DRAWINGS

FIG. 7 shows a first operation program of the first robot device.

FIG. 8 shows a setting file in which a user coordinate system is set.

FIG. 12 shows a second operation program of the first robot device.

FIG. 13 shows a setting file in which a user reference coordinate system is set.

FIG. 14 shows a setting file in which a leader coordinate system is set.

DETAILED DESCRIPTION

Referring to FIGS. 1 to 39, a robot controller according to an embodiment will be described below. In the present embodiment, a robot device for fixing a workpiece by arc welding will be described below.

Figure 1:
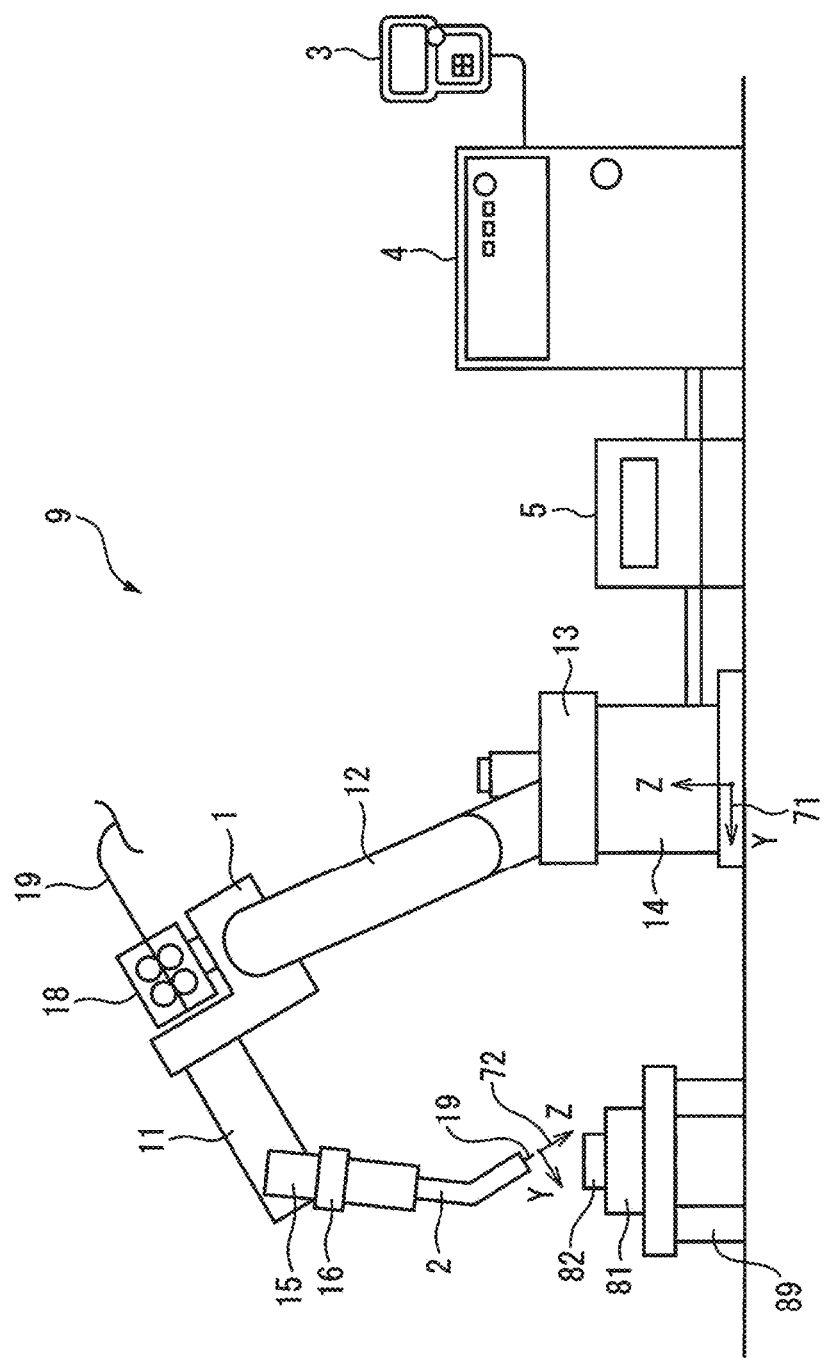
FIG. 1 is a schematic diagram of a first robot device according to an embodiment.
Figure 2:
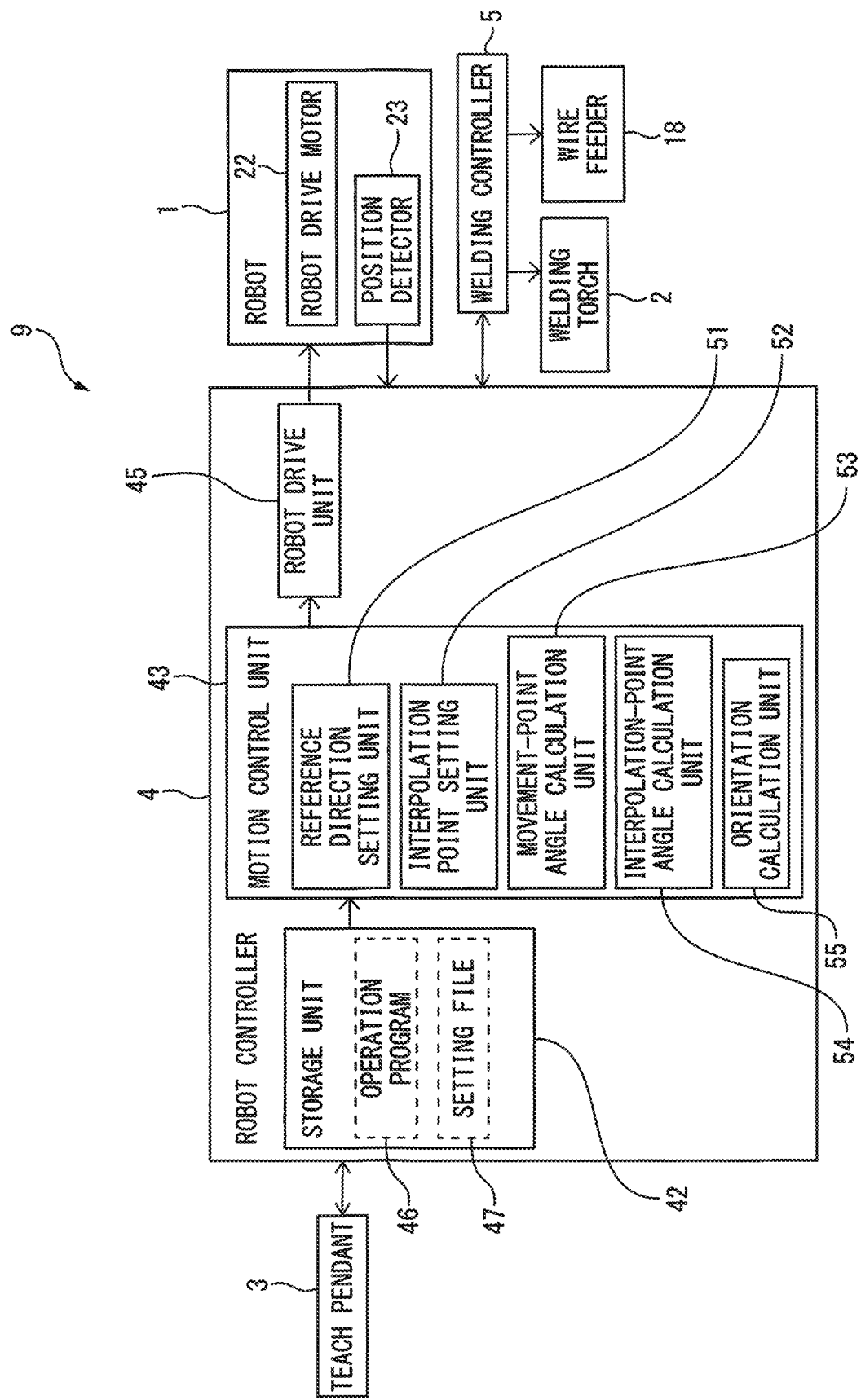
FIG. 2 is a block diagram showing a first robot device.

FIG. 1 is a schematic diagram of a first robot device according to the present embodiment. FIG. 2 is a block diagram of the first robot device according to the present embodiment. Referring to FIGS. 1 and 2, a first robot device 9 includes a welding torch 2 that acts as an operation tool and a robot 1 that moves the welding torch 2. The robot 1 of the present embodiment is an articulated robot including a plurality of joints.

The robot 1 includes a base part 14 and a rotation base 13 supported by the base part 14. The base part 14 is fixed to an installation surface. The rotation base 13 rotates relative to the base part 14. The robot 1 includes an upper arm 11 and a lower arm 12. The lower arm 12 is supported by the rotation base 13 via a joint. The upper arm 11 is supported by the lower arm 12 via a joint. The robot 1 includes a wrist 15 connected to one end of the upper arm 11. The wrist 15 is supported by the upper arm 11 via a joint. The welding torch 2 is fixed to a flange 16 of the wrist 15.

The robot 1 of the present embodiment includes six drive axes. The robot 1 includes a robot drive device that drives components including the upper arm 11. The robot drive device of the present embodiment includes a plurality of robot drive motors 22 for driving the upper arm 11, the lower arm 12, the rotation base 13, and the wrist 15. The orientations of the components of the robot 1 are changed in the joints, whereby the position and orientation of the robot 1 is changed.

The robot device 9 includes a robot controller 4 that controls the robot 1. The robot controller 4 includes an arithmetic processing device (computer) having a central processing unit (CPU) as a processor. The arithmetic processing device includes RAM (Random Access Memory), ROM (Read Only Memory), and etc. that are connected to the CPU via a bus. The robot 1 is connected to the robot controller 4 via a communication line.

The robot device 9 includes a wire feeder 18 for feeding a wire 19 to the welding torch 2. The wire feeder 18 feeds the wire 19 that wears along with welding, to the welding torch 2. The wire feeder 18 is fixed to the robot 1.

The robot device 9 includes a welding controller 5 that controls the welding torch 2 and the wire feeder 18. The welding controller 5 includes an arithmetic processing device (computer) having a CPU as a processor. The arithmetic processing device includes RAM, ROM, and etc. that are connected to the CPU via a bus. The welding controller 5 includes a power supply that supplies electricity to the welding torch 2 and the wire feeder 18. The welding controller 5 of the present embodiment is connected to the robot controller 4. The welding controller 5 is formed so as to communicate with the robot controller 4. The welding controller 5 supplies electricity to the welding torch 2 or supplies the wire 19 in response to a motion of the robot 1. The welding controller 5 of the present embodiment is controlled by the robot controller 4.

A teach pendant 3 for an operation of the robot controller 4 by an operator is connected to the robot controller 4. The teach pendant 3 includes an input part for inputting information on the robot 1 and the welding torch 2. The input part is constituted by a keyboard, a dial, and etc. The teach pendant 3 includes a display part that displays the information on the robot 1 and the welding torch 2. An operation program 46 created in advance for controlling the robot device 9 is inputted to the robot controller 4. Alternatively, the operator operates the teach pendant 3 so as to drive the robot 1, whereby a teaching operation for setting the teaching points of the robot 1 can be performed. The robot controller 4 can generate the operation program 46 for the robot 1 and the welding torch 2 based on the teaching points. The robot device 9 performs welding based on the operation program 46.

The robot controller 4 includes a storage unit 42 that stores information on the control of the robot 1 and the welding torch 2. The operation program 46 and a setting file 47 in which a set value for control is set are stored in the storage unit 42. The storage unit 42 may be constituted by a storage medium such as a volatile memory, a nonvolatile memory, or a hard disk that is capable of storing information. A processor acting as a motion control unit 43 is formed so as to read information stored in the storage unit 54.

The robot controller 4 includes the motion control unit 43 that controls the motion of the robot 1. The motion control unit 43 is equivalent to the processor driven according to the operation program 46. The processor reads the operation program 46 and performs control as determined in the operation program 46, so that the processor acts as the motion control unit 43.

The motion control unit 43 transmits a motion command for driving the robot 1, based on the operation program 46, to a robot drive unit 45. The robot drive unit 45 includes a power supply for driving the robot driving motors 22. The robot drive unit 45 supplies electricity to the robot drive motors 22 based on the motion command.

Moreover, the motion control unit 43 controls the motion of the welding torch 2. The motion control unit 43 transmits a motion command for driving the welding torch 2 and the wire feeder 18, based on the operation program 46, to the welding controller 5. The welding controller 5 supplies electricity to the welding torch 2 and the wire feeder 18 based on the motion command.

The robot 1 includes a status detector that detects the position and orientation of the robot 1. The status detector of the present embodiment includes position detectors 23 that are attached to the robot drive motors 22. The orientations of the components of the robot 1 can be acquired on the drive axes by the outputs of the position detectors 23. For example, the position detector 23 detects a rotation angle when the robot drive motor 22 is driven. In the present embodiment, the position and orientation of the robot 1 are detected based on the outputs of the position detectors 23.

In the robot device 9 of the present embodiment, a world coordinate system 71 is set. In the example of FIG. 1, the origin of the world coordinate system 71 is disposed in the base part 14 of the robot 1. The world coordinate system 71 is also referred to as a reference frame of the robot. The world coordinate system 71 is a frame where the position of the origin is fixed and the directions of the coordinate axes are fixed. Even if the position and orientation of the robot 1 are changed, the position and orientation of the world coordinate system 71 remain unchanged. The world coordinate system 71 has, as coordinate axes, the X-axis, the Y-axis, and the Z-axis that are orthogonal to one another. Moreover, the W-axis is set as a coordinate axis around the X-axis. The P-axis is set as a coordinate axis around the Y-axis. The R-axis is set as a coordinate axis around the Z-axis.

In the present embodiment, a tool coordinate system is set with the origin set at any position of the operation tool. The origin of a tool coordinate system 72 of the present embodiment is set at a tool center point. The tool coordinate system 72 has, as coordinate axes, the X-axis, the Y-axis, and the Z-axis that are orthogonal to one another. In the example of FIG. 1, the tool coordinate system 72 is set such that the Z-axis is parallel to the direction in which the wire 19 projecting from the tip of the welding torch 2 extends. Moreover, the tool coordinate system 72 has the W-axis around the X-axis, the P-axis around the Y-axis, and the R-axis around the Z-axis.

When the position and orientation of the robot 1 are changed, the orientation and the position of the origin of the tool coordinate system 72 are changed. For example, the position of the robot 1 is equivalent to the position of the tool center point (the position of the origin of the tool coordinate system 72). Moreover, the orientation of the robot 1 is equivalent to the orientation of the tool coordinate system 72 with respect to the world coordinate system 71.

Figure 3:
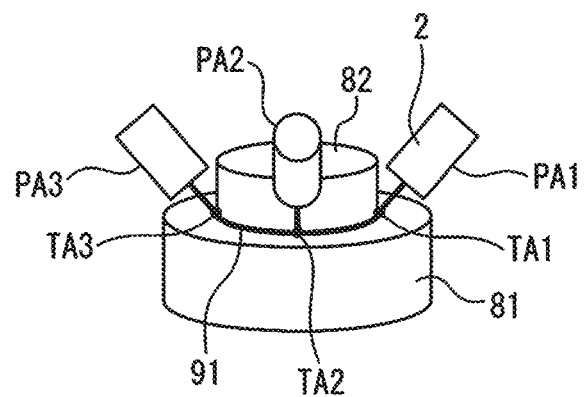
FIG. 3 is a perspective view of workpieces and a welding torch when the workpieces are welded by the first robot device.

FIG. 3 is a perspective view of workpieces to be welded by the first robot device and the welding torch. Referring to FIGS. 1 and 3, the first robot device 9 fixes a workpiece 82 to a workpiece 81 by welding. The workpieces 81 and 82 are fixed to a pedestal 89. The workpiece 81 is formed so as to have a top surface extending in the horizontal direction when the workpiece 81 is fixed to the pedestal 89. In the example of FIG. 3, movement points TA1, TA2, and TA3 are set so as to move the tool center point of the welding torch 2 along a movement path 91. The workpiece 82 has a circular shape in plan view. In the present embodiment, the robot 1 performs an arc motion so that the movement path 91 on which the tool center point moves has the arc-shaped path. The movement path 91 extends in the horizontal direction.

In this example, the positions of the movement points TA1, TA2, and TA3 are determined for the position of the tool center point of the welding torch 2. The movement point TA1 is the start point, the movement point TA2 is the via point, and the movement point TA3 is the end point. Furthermore, the orientations of the robot 1 are determined at positions PA1, PA2, and PA3 of the welding torch 2. The orientation of the robot 1 corresponds to the orientation of the welding torch 2. In the example of FIG. 3, the orientation of the welding torch 2 is determined so as to keep the angle of the axis line (the extending direction of the wire) of the welding torch 2 with respect to the vertical direction. In the operation program 46, the positions and orientations of the robot 1 at the movement points are determined.

Figure 4:
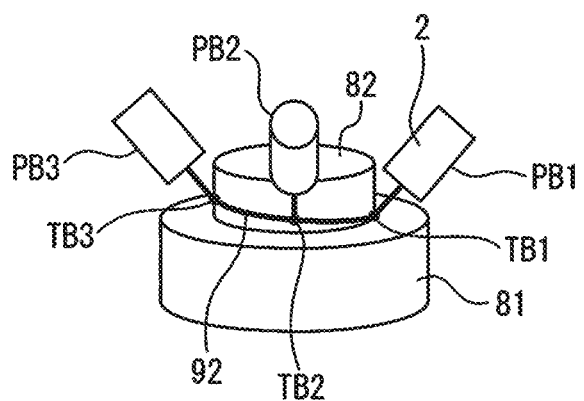
FIG. 4 is another perspective view of the workpieces and the welding torch when the workpieces are welded by the first robot device.

FIG. 4 is another perspective view of the workpieces and the welding torch. The operator may correct the position of the robot 1 in order to correct the movement path during a teaching operation. Referring to FIGS. 3 and 4, a movement point TB1 corresponds to the movement point TA1, a movement point TB2 corresponds to the movement point TA2, and a movement point TB3 corresponds to the movement point TA3. A position PB2 and a position PB3 of the welding torch 2 are moved upward. The movement path 91 is slightly moved so as to generate a movement path 92. The movement path 92 extends so as to tilt with respect to the horizontal direction.

If the robot 1 is driven, the robot controller 4 controls the robot 1 to positions and orientations at the movement points TB1, TB2, and TB3 as set by the operator.

The robot controller 4 sets interpolation points between the movement points TB1, TB2, and TB3. The interpolation point corresponds to a point through which the tool center point passes. The robot controller 4 calculates the arc-shaped movement path 92 based on the movement points TB1, TB2, and TB3. The robot controller 4 sets interpolation points on the movement path 92. The method of setting the interpolation points is determined in advance. For example, a predetermined number of interpolation points are set between two movement points. The robot controller 4 calculates the positions of the interpolation points. Furthermore, the robot controller 4 calculates the orientation of the robot 1 at the interpolation points.

In the control of an arc motion in a reference example, which will be discussed later, a reference plane passing through the three movement points TB1, TB2, and TB3 is calculated and the normal direction of the reference plane is set as a reference direction. The robot controller 4 can calculate the orientation of the robot 1 at interpolation points by using an angle relating to this reference direction. Under this control, however, the orientation of the welding torch 2 may sway in a section between the movement points TB1, TB2, and TB3.

In the control of the present embodiment, a direction independent from the movement points TB1, TB2, and TB3 of the robot 1 is set as the reference direction. In other words, the reference direction is set to be unchanged even if the positions of the movement points TB1, TB2, and TB3 of the robot 1 are changed. The orientation of the robot 1 is calculated at the interpolation points by using an angle relating to the reference direction.

Figure 5:
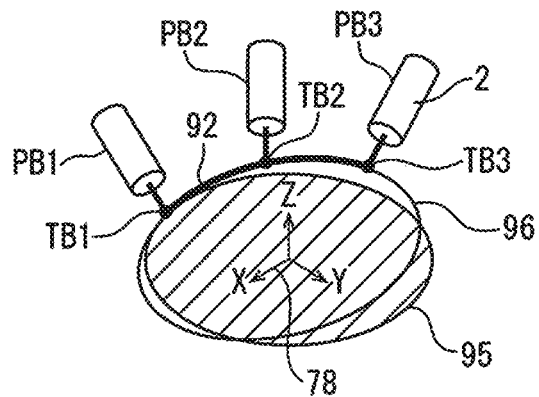
FIG. 5 is a perspective view for explaining a reference direction in the first robot device.

FIG. 5 is a schematic diagram for explaining the reference direction for performing an arc motion according to the present embodiment. A plane 95 is a plane passing through the movement points TA1, TA2, and TA3. In other words, the plane 95 includes the movement path 91 in FIG. 3 and extends in the horizontal direction.

As illustrated in FIGS. 3 and 4, the movement points TB2 and TB3 are moved upward from the movement points TA2 and TA3. A plane 96 is a plane passing through the movement points TB1, TB2, and TB3. The plane 96 is inclined from the plane 95. In the present embodiment, the reference direction is set based on the plane 95 independent from the movement points TB1, TB2, and TB3. The plane 95 is set as the reference plane and the normal direction of the plane 95 is set as the reference direction.

In the present embodiment, a reference coordinate system 78 for setting the reference direction is set such that the plane 95 includes the X-axis and the Y-axis. The Z-axis direction of the reference coordinate system 78 serves as the reference direction. In this way, the operator sets the reference direction that is irrelevant to the plane passing through the three movement points TB1, TB2, and TB3.

Figure 6:
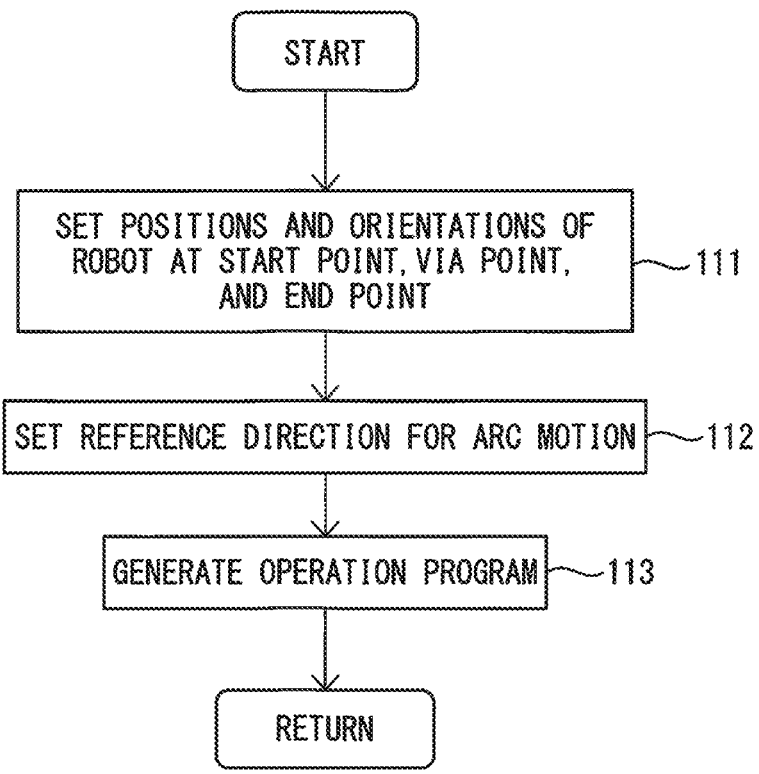
FIG. 6 is a flowchart for explaining control for generating an operation program in the first robot device.

FIG. 6 is a flowchart showing the steps of generating the operation program according to the present embodiment. In step 111, the operator sets a start point, a via point, and an end point as movement points in order to perform an arc motion. The operator sets the positions of the movement points and the orientation of the robot at the movement points.

The operator can set teaching points according to a teaching operation. The operator adjusts the position and orientation of the robot 1 by operating the teach pendant 3. The operator can store the position and orientation of the robot 1 as teaching points in the robot controller 4 when the position and orientation of the robot 1 are placed in a desired state.

Referring to FIG. 3, the operator sets the movement point TA1 as the start point, the movement point TA2 as the via point, and the movement point TA3 as the end point. Moreover, the operator sets the orientation of the welding torch 2 at the movement points TA1, TA2, and TA3. Referring to FIG. 4, the operator then corrects the positions of the movement points TA1, TA2, and TA3 to the positions of the movement points TB1, TB2, and TB3.

The setting of the movement points is not limited to a method of specifying teaching points while moving the robot 1. The operator may input the positions and orientations of the robot 1 at the respective movement points from the input part of the teach pendant 3. For example, the operator may input the positions and orientations of the robot 1 at the movement points into the teach pendant 3 by using the coordinate values of the world coordinate system 71.

Referring to FIG. 6, in step 112, the operator sets the reference direction for an arc motion. Referring to FIG. 5, in the present embodiment, the plane 95 is set as the reference plane and the normal direction of the plane 95 is set as the reference direction. Specifically, the Z-axis direction of the reference coordinate system 78 serves as the reference direction. In this example, the operator sets the reference coordinate system 78 as a user coordinate system. The user coordinate system is a coordinate system where the position of the origin and the orientation of the coordinate axis remain unchanged even if the position and orientation of the robot 1 are changed. The user coordinate system can be set with the origin at a position selected by the operator. Moreover, the user coordinate system can be set with the orientation selected by the operator. The user coordinate system can be inputted by the operator in advance through the teach pendant 3.

Subsequently, in step 113, the robot controller 4 creates the operation program 46 of the robot device 9 and the setting file 47 associated with the operation program 46.

FIG. 7 shows a first operation program of the first robot device according to the present embodiment. An operation program 46a includes information on movement points for determining a motion of the robot 1. In the operation program 46a, the movement points are indicated with symbols P. In the example of FIG. 7, movement points P[1], P[2], P[3], P[4], and P[5] are set.

The positions and orientations of the robot 1 at the respective movement points are set in a setting file different from the operation program 46a. Alternatively, the positions and orientations of the robot 1 at the movement points may be described at the end of the operation program 46a. The positions and orientations of the robot 1 at the respective movement points can be set by the coordinate values of any coordinate system. For example, the positions and orientations of the robot can be set by using the coordinate values of the world coordinate system.

In the present embodiment, the position of the robot 1 at the movement point is specified by the position of the tool center point. The position of the tool center point is specified by the coordinate value of the X-axis, the coordinate value of the Y-axis, and the coordinate value of the Z-axis of the world coordinate system 71. Moreover, the orientation of the robot 1 at the movement point is specified by the orientation of the tool coordinate system 72. The orientation of the tool coordinate system 72 is specified by the coordinate value of the W-axis, the coordinate value of the P-axis, and the coordinate value of the R-axis of the world coordinate system 71.

At the respective movement points, the robot controller 4 controls the robot 1 to the position and the orientation described in the operation program 46a. For example, in a first command statement of the operation program 46a, a command for a movement to the movement point P[1] is described. More specifically, a symbol J indicates a movement of the robot 1 by the driving each of the drive axes. Moreover, a command is described for a movement at a 100% speed relative to the maximum speed of each of the drive axes. A symbol FINE indicates that the robot is driven with high accuracy. In other words, in the first command statement, a movement to the movement point P[1] with the respective drive axes at the maximum speed is shown.

A symbol C in the third command statement and the fourth command statement indicates a command for an arc motion. In this example, the robot controller 4 performs an arc motion by using the movement points P[1], P[2], and P[3]. Furthermore, the robot controller 4 performs an arc motion by using the movement points P[3], P[4], and P[5]. In this example, a command is described for a movement at 500 mm/sec from the movement point P[1] to the movement point P[3]. Moreover, a command is described for a movement at a speed of 500 mm/sec from the movement point P[3] to the movement point P[5].

In the second row of the operation program 46a, a symbol ORNTBASE is described as a command for setting the reference direction in an arc motion. The symbol ORNTBASE is followed by a symbol UF[1,Z] indicating the reference direction for performing an arc motion. The symbol UF[1,Z] indicates that the reference direction is the Z-axis direction of a user coordinate system UF[1]. This command fixes the reference direction regardless of the positions of the movement points.

FIG. 8 shows an example of the setting file of the user coordinate system. In a setting file 47a, the user coordinate system UF[1] is set by the coordinate values of the world coordinate system 71. The position of the origin of the user coordinate system UF[1] is set by the coordinate value of the X-axis, the coordinate value of the Y-axis, and the coordinate value of the Z-axis. The orientation of the user coordinate system UF[1] is set by the coordinate value of the W-axis, the coordinate value of the P-axis, and the coordinate value of the R-axis of the world coordinate system 71.

For example, in the example of FIG. 5, the reference direction is parallel with the Z-axis direction of the world coordinate system 71. Thus, the user coordinate system UF[1] can be set at the same coordinate system as the world coordinate system 71. In this case, the coordinate values of all the coordinate axes can be set at 0.

Referring to FIG. 7, in the fifth row of the operation program 46a, a symbol ORNTBASE END for terminating the specification of the reference direction is described. This command resets the reference direction during an arc motion. If a command for an arc motion is described after the fifth row, a reference coordinate system for setting another reference direction is set. Alternatively, the controller may set the reference direction under predetermined control. For example, the controller can set, as the reference direction, a direction perpendicular to a plane passing through the three movement points of an arc motion, which will be discussed in the reference example. In this way, in the present embodiment, the reference direction for an arc motion can be fixed in a specific section.

Referring to FIGS. 2 and 4, the motion control unit 43 of the present embodiment includes a reference direction setting unit 51 that sets the reference direction when an arc motion is performed. The motion control unit 43 includes an interpolation point setting unit 52 that sets an interpolation point between the movement points. The interpolation point setting unit 52 calculates the position of an interpolation point by performing position interpolation control for interpolating the positions of the movement points. The interpolation point setting unit 52 calculates an arc passing through the movement points TB1, TB2, and TB3. In other words, the interpolation point setting unit 52 calculates the movement path 92. The interpolation point setting unit 52 sets interpolation points between the movement points TB1, TB2, and TB3 according to a predetermined rule. The interpolation points are set on the movement path 92. For example, the interpolation point setting unit 52 can place a predetermined number of interpolation points at regular intervals between the movement points.

The robot controller 4 performs orientation interpolation control in which the orientation of the operation tool at each interpolation point is calculated by interpolation. The motion control unit 43 includes a movement-point angle calculation unit 53 that calculates an angle at the movement point relating to the reference direction based on the orientation of the robot 1. The angle relating to the reference direction according to the present embodiment is the azimuth angle and the elevation angle of the operation tool based on the reference direction. The angle relating to the reference direction is not limited to this embodiment. Any angle may be used with respect to the reference direction.

For example, the direction of the operation tool can be set to the direction in which the wire 19 projecting from the tip of the welding torch 2 extends. Alternatively, the direction of the operation tool can be set to the direction of the axial line of the operation tool. In this way, the direction of the operation tool can be set to the Z-axis direction of the tool coordinate system 72. The elevation angle of the operation tool can be an angle with respect to the Z-axis direction of the reference coordinate system 78. Alternatively, the elevation angle of the operation tool can be an angle with respect to a plane including the X-axis and the Y-axis of the reference direction. The azimuth angle of the operation tool can be an angle in which the X-axis direction is set to, for example, 0 in the plane including the X-axis and the Y-axis of the reference coordinate system 78. The movement-point angle calculation unit 53 calculates the azimuth angle and the elevation angle of the operation tool at each of the movement points.

The motion control unit 43 includes an interpolation-point angle calculation unit 54 that calculates the angle of the operation tool relating to the reference direction at the interpolation point. The interpolation-point angle calculation unit 54 calculates an angle relating to the reference direction at the interpolation point by interpolating the angles of the operation tool relating to the reference direction at the movement points. The interpolation-point angle calculation unit 54 calculates the azimuth angle and the elevation angle of the operation tool at each interpolation point based on the azimuth angles and the elevation angles of the operation tool at the movement points. The method of interpolation can be, for example, linear interpolation performed based on a distance between the interpolation points.

The motion control unit 43 includes an orientation calculation unit 55 that calculates the orientation of the robot 1 at the interpolation point based on the angle of the operation tool relating to the reference direction at the interpolation point. The orientation calculation unit 55 acquires the position of the interpolation point, the position being calculated by the interpolation point setting unit 52. The orientation calculation unit 55 acquires an angle relating to the reference direction of the operation tool at the interpolation point, the angle being calculated by the interpolation-point angle calculation unit 54. The orientation calculation unit 55 calculates the position and the orientation of the robot based on the position of the interpolation point and an angle relating to the reference direction of the operation tool at the interpolation point.

The reference direction setting unit 51, the interpolation point setting unit 52, the movement-point angle calculation unit 53, the interpolation-point angle calculation unit 54, and the orientation calculation unit 55 are equivalent to the processor driven according to the operation program 46. The processor reads the operation program 46 and performs the control as determined in the operation program 46, so that the processor act as the respective units.

Figure 9:
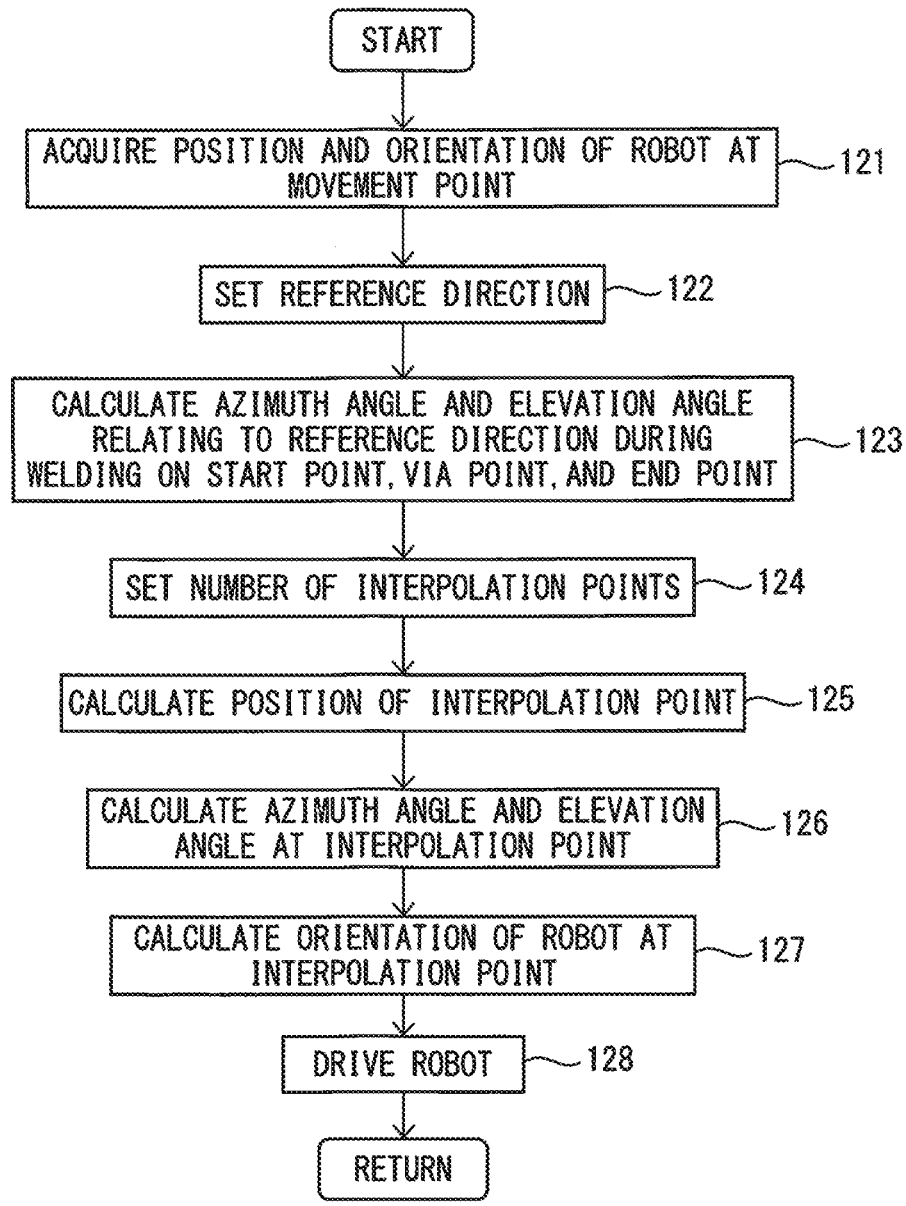
FIG. 9 is a flowchart of the control of the position and orientation of a robot in the first robot device.

FIG. 9 is a flowchart of control when the robot performs the arc motion. Referring to FIGS. 2 and 9, in step 121, the motion control unit 43 acquires the positions and orientations of the robot 1 at the movement points TB1, TB2, and TB3 from the operation program 46a and the setting file 47a. The movement points are, for example, a start point, a via point, and an end point during the arc motion. In step 122, the reference direction setting unit 51 acquires the reference direction from the operation program 46a.

Subsequently, in step 123, the movement-point angle calculation unit 53 calculates the azimuth angle and the elevation angle of the welding torch 2 relating to the reference direction during welding on the start point, the via point, and the end point. The azimuth angle and the elevation angle relating to the reference direction can be calculated based on the orientation of the robot 1 at the movement point and the reference direction.

Thereafter, in step 124, the interpolation point setting unit 52 sets the number of interpolation points. The number of interpolation points is preset in, for example, the operation program 46a. Alternatively, the number of interpolation points is automatically set. In step 125, the interpolation point setting unit 52 calculates, as the movement path 92, an arc passing through the movement points TB1, TB2, and TB3. The interpolation point setting unit 52 calculates the position of the interpolation point by interpolating the positions of the movement points TB1, TB2, and TB3.

Subsequently, in step 126, the interpolation-point angle calculation unit 54 calculates the azimuth angle and the elevation angle of the welding torch 2 relating to the reference direction at interpolation points. For example, the interpolation-point angle calculation unit 54 calculates an azimuth angle and an elevation angle at each interpolation point by linearly interpolating azimuth angles and elevation angles at the movement points TB1, TB2, and TB3.

Subsequently, in step 127, the orientation calculation unit 55 calculates the orientation of the robot 1 at the interpolation point based on the azimuth angle and the elevation angle of the welding torch 2 at the interpolation point. In this case, the orientation of the welding torch 2 (the Z-axis direction of the tool coordinate system 72) corresponds to the orientation of the robot 1. Moreover, the position of the interpolation point corresponds to the position of the robot 1. The orientation calculation unit 55 calculates the position and the orientation of the robot 1 at the interpolation point based on information on the interpolation point.

In step 128, the motion control unit 43 drives the robot 1 to a position and an orientation at the movement point as set by the operation program 46a and drives the robot 1 to a position and an orientation as calculated at the interpolation point.

Figure 10:
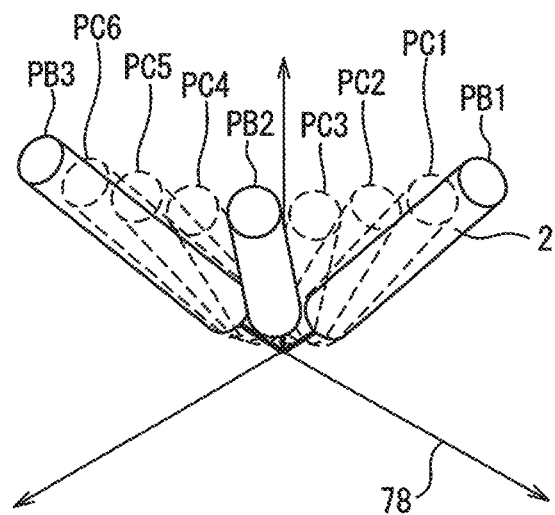
FIG. 10 is a perspective view for explaining the orientation of the welding torch at movement points and interpolation points in the first robot device.

FIG. 10 is a perspective view of the welding torch at movement points and interpolation points when the tool center point is disposed at the origin of the reference coordinate system. In the example of FIG. 10, three interpolation points are set between a position PB1 and a position PB2, whereby positions PC1, PC2, and PC3 are indicated. Moreover, three interpolation points are set between the position PB2 and a position PB3, whereby positions PC4, PC5, and PC6 are indicated. It is understood that the orientation of the welding torch 2 at the movement points and the interpolation points smoothly changes without swaying.

Figure 11:
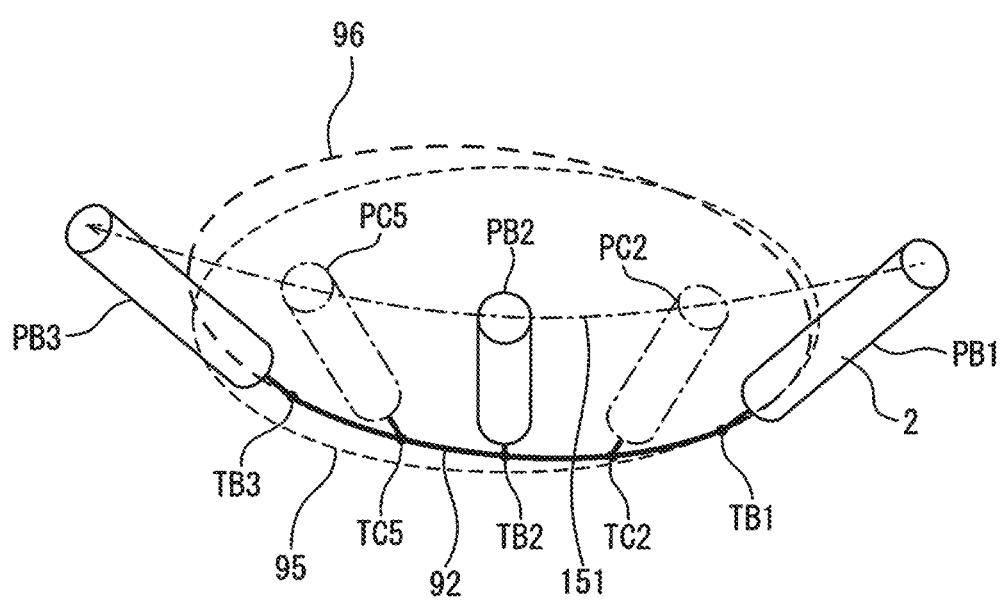
FIG. 11 is another perspective view for explaining the orientation of the welding torch at movement points and interpolation points in the first robot device.

FIG. 11 is a perspective view for explaining the orientation of the welding torch when the welding torch moves from the start point to the end point. The motion during welding on the movement path 92 arranged on the plane 96 is shown, the plane 96 being tilted with respect to the plane 95 that extends in the horizontal direction. FIG. 11 illustrates the welding torch 2 disposed at the positions PC2 and PC5 equivalent to interpolation points TC2 and TC5. As indicated by an arrow 151, the track of points set at the predetermined positions of the welding torch 2 is not swayed but shows a smooth movement. As a result, the high quality of welding can be kept.

In the above embodiment, the reference direction is set by the user coordinate system, but the embodiment is not limited to this. The reference direction can be set by any coordinate system. Another coordinate system for setting the reference direction will be described below.

FIG. 12 shows a second operation program according to the present embodiment. In the second operation program 46b, an arc motion is performed by the movement points P[1], P[2], and P[3]. Moreover, an arc motion is performed by the movement points P[3], P[4], and P[5]. In the arc motion from the movement point P[1] to the movement point P[3], a symbol ORNTBASE specifies the X-axis direction of a user coordinate system UF[1] as the reference direction.

In the control for a movement from the movement point P[3] to the movement point P[5], a user reference coordinate system REF[1] is set as a coordinate system for setting the reference direction. The user reference coordinate system is a coordinate system specified in a teaching period. The user reference coordinate system is a coordinate system where the position of the origin and orientation remain unchanged even if the position and orientation of the robot 1 are changed. The user reference coordinate system can be set with the origin at a position selected by the operator. Moreover, the user reference coordinate system can be set with the orientation selected by the operator.

The user reference coordinate system REF[1] can be set by an operation performed by the operator on the teach pendant 3. The operator adjusts the position and orientation of the robot 1 by operating the teach pendant 3. The operator can set, as the reference direction, the extending direction of the wire 19 projecting from the welding torch 2 (the Z-axis direction of the tool coordinate system 72). The operator can store the tool coordinate system 72 as the user reference coordinate system in the storage unit 42 when the extending direction of the wire 19 is parallel with a desired direction.

FIG. 13 shows an example of the setting file of the user reference coordinate system. In the user reference coordinate system of the present embodiment, the position of the origin and orientation are set by using the world coordinate system. In a setting file 47*b*, the position of the origin of the user reference coordinate system is set by the coordinate value of the X-axis, the coordinate value of the Y-axis, and the coordinate value of the Z-axis of the world coordinate system. The orientation of the user reference coordinate system is set by the coordinate value of the W-axis, the coordinate value of the P-axis, and the coordinate value of the R-axis of the world coordinate system.

FIG. 14 shows an example of the setting file of a leader coordinate system. In addition to the user coordinate system and the user reference coordinate system, the leader coordinate system can be described as a coordinate system for setting the reference direction. Also in a setting file 47*c* of the leader coordinate system, the position and orientation of the leader coordinate system can be set by using the coordinate values of a predetermined coordinate system. For example, the position and orientation of the leader coordinate system are set by the coordinate values of the world coordinate system 71.

Figure 15:
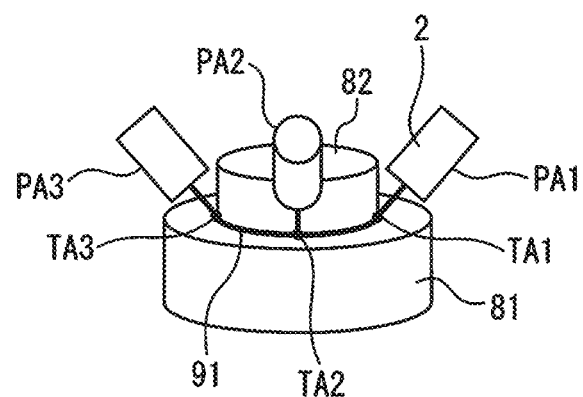
FIG. 15 is a perspective view of workpieces and the welding torch in the control of a first reference example.

The control of an arc motion of the reference example will be described below. FIG. 15 is a perspective view of a workpiece and the welding torch according to a first reference example. In the first reference example, the workpiece 82 is welded to the workpiece 81 along the movement path 91. The welding torch 2 moves from a position PA1 to a position PA3 through a position PA2. In the operation program, the movement points TA1, TA2, and TA3 are set.

Figure 16:
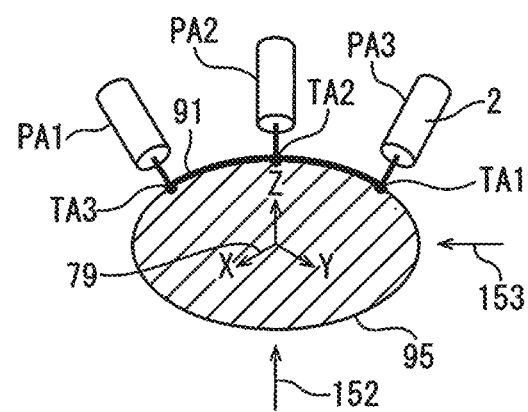
FIG. 16 is a perspective view for explaining a reference direction according to the first reference example.

FIG. 16 is a perspective view for explaining the reference direction according to the first reference example. In the reference example, the plane 95 including the movement points TA1, TA2, and TA3 is set as the reference plane by the reference direction setting unit 51. The reference plane horizontally extends in this example. Subsequently, the normal direction of the plane 95 is set as the reference direction. A reference coordinate system 79 is set such that the Z-axis direction is perpendicular to the plane 95. A circle is calculated by the movement point TA1 serving as a start point, the movement point TA2 serving as a via point, and the movement point TA3 serving as an end point. In this example, the reference coordinate system 79 is set with the origin located at the center of the circle.

The reference direction setting unit 51 sets the Z-axis direction of the reference coordinate system 79 as the reference direction. The interpolation point setting unit 52 sets interpolation points along the movement path 91. The movement-point angle calculation unit 53 calculates the angle of the welding torch 2 relating to the reference direction at the movement point.

The interpolation-point angle calculation unit 54 calculates the angle of the welding torch 2 relating to the reference direction at the interpolation point by interpolating the angles of the welding torch 2 relating to the reference direction at the movement points TA1, TA2, and TA3. The interpolation-point angle calculation unit 54 calculates the azimuth angle and the elevation angle of the welding torch 2 at each interpolation point based on the azimuth angle and the elevation angle of the welding torch 2 at the movement point. The orientation calculation unit 55 calculates the orientation of the robot 1 based on the azimuth angle and the elevation angle of the welding torch 2 at the interpolation point.

Figure 17:
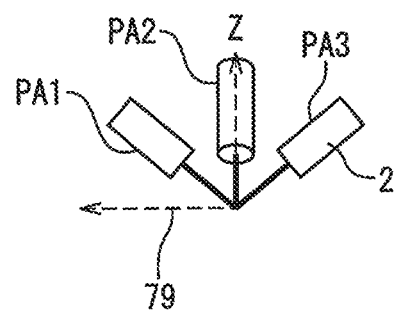
FIG. 17 is a front view for explaining the orientation of the welding torch according to the first reference example.
Figure 18:
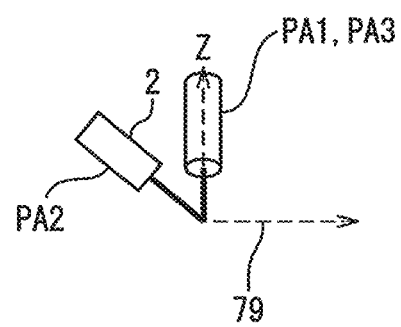
FIG. 18 is a side view for explaining the orientation of the welding torch according to the first reference example.

FIG. 17 is a first view for explaining the orientations of the welding torch at the start point, the via point, and the end point. FIG. 17 is a front view in the direction of the arrow 152 of FIG. 16. FIG. 18 is a second view for explaining the orientation of the welding torch at the start point, the via point, and the end point. FIG. 18 is a side view in the direction of the arrow 153 of FIG. 16. In FIG. 17 and FIG. 18, the tool center point of the welding torch 2 is disposed at the origin of the reference coordinate system 79. Referring to FIG. 17 and FIG. 18, the Z-axis direction of the reference coordinate system 79 serves as the reference direction. The angle of the welding torch 2 in the axial direction with respect to the reference direction (the elevation angle of the welding torch 2) is kept constant at the position PA1, the position PA2, and the position PA3.

Figure 19:
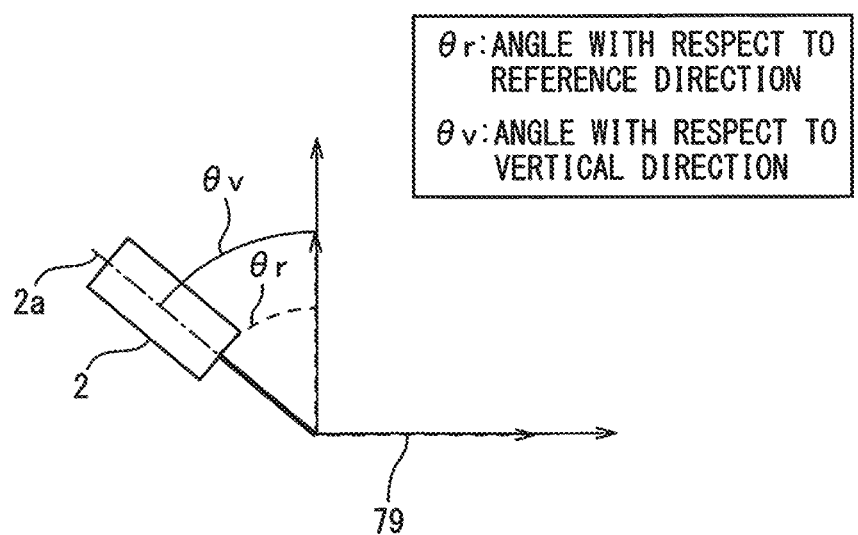
FIG. 19 is an explanatory drawing of an angle with respect to the reference direction and an angle with respect to the vertical direction according to the first reference example.
Figure 20:
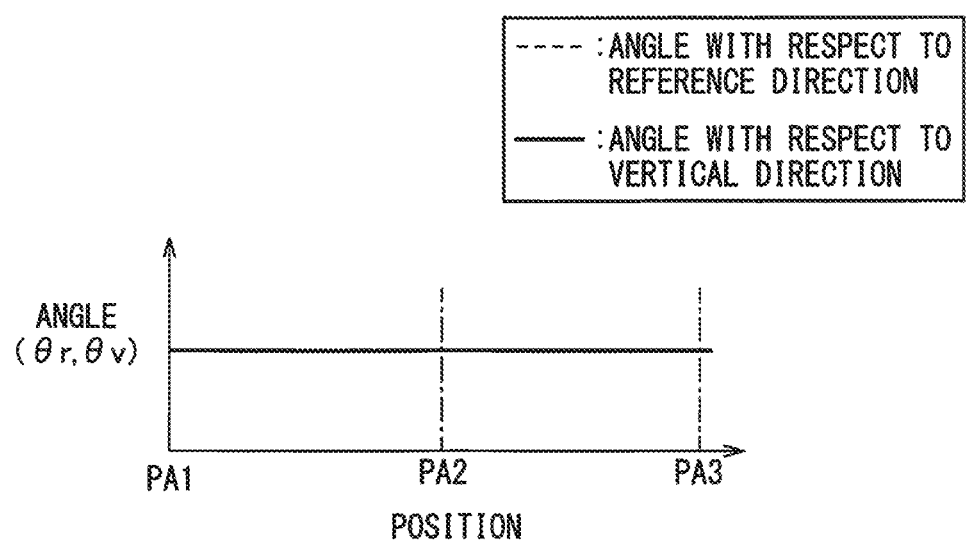
FIG. 20 is a graph showing an angle of the welding torch with respect to the position of the movement point according to the first reference example.

FIG. 19 is an explanatory drawing of the angle of the welding torch with respect to the reference direction or the vertical direction. FIG. 20 is a graph of the angle of the welding torch with respect to the position of the welding torch. Referring to FIG. 19 and FIG. 20, an angle θr of an axis 2*a* with respect to the reference direction and an angle θv of the axis 2*a* with respect to the vertical direction are determined as the angles of the welding torch 2. The reference direction and the vertical direction are parallel to each other. It is understood that the angle θr is equal to the angle θv at the positions PA1, PA2, and PA3.

Figure 21:
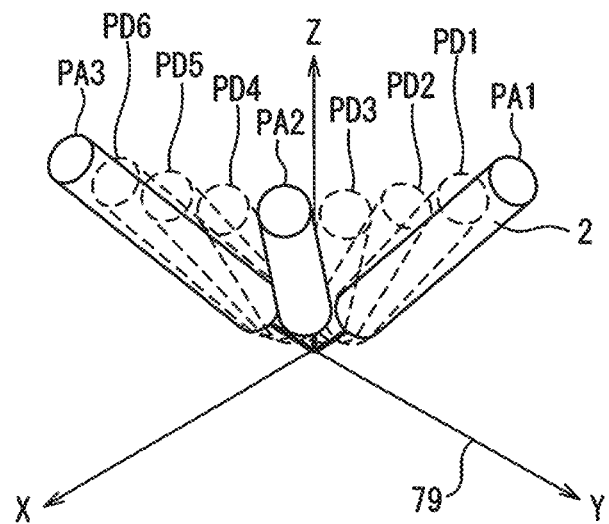
FIG. 21 is a perspective view for explaining the orientation of the welding torch at movement points and interpolation points in the first reference example.
Figure 22:
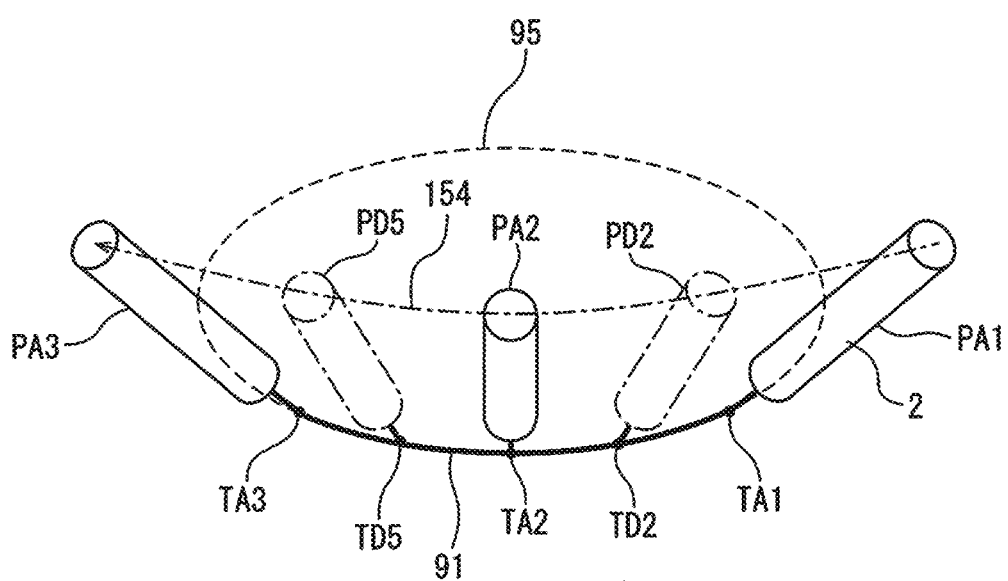
FIG. 22 is another perspective view for explaining the orientation of the welding torch at movement points and interpolation points in the first reference example.

FIG. 21 is a perspective view for explaining the orientation of the welding torch in the first reference example. In FIG. 21, the tool center point is disposed at the origin of the reference coordinate system 79. FIG. 22 is another perspective view for explaining the orientation of the welding torch in the first reference example. In FIG. 22, positions PD2 and PD5 of the welding torch 2 are illustrated, the positions PD2 and PD5 being equivalent to interpolation points TD2 and TD5 among the interpolation points.

Referring to FIG. 21 and FIG. 22, in the first reference example, the orientation of the welding torch 2 smoothly changes at the positions PD1, PD2, and PD3 equivalent to the interpolation points. Furthermore, the orientation of the welding torch 2 smoothly changes at the positions PD4, PD5, and PD6 equivalent to the interpolation points. In the first reference example, as indicated by an arrow 154, the orientation of the welding torch 2 smoothly changes during the welding of the movement path 91 without swaying.

Figure 23:
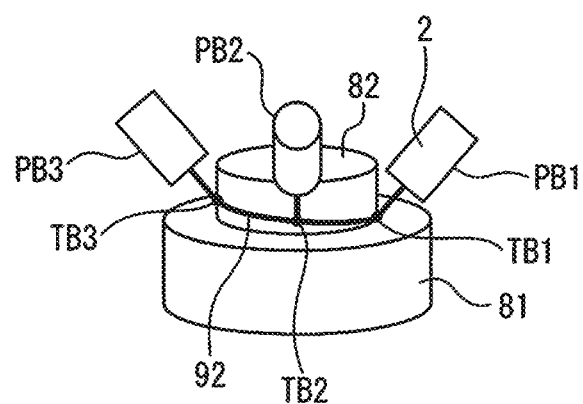
FIG. 23 is a perspective view of the workpieces and the welding torch in the control of a second reference example.

FIG. 23 is a perspective view of a workpiece and the welding torch according to a second reference example. In the second reference example, the positions of the movement points TA1, TA2, and TA3 of the first reference example are corrected to the positions TB1, TB2, and TB3 by the operator. In the second reference example, welding is performed along the movement path 92. The welding torch 2 moves from a position PB1 to a position PB3 through a position PB2. As compared with the first reference example of FIG. 15, the movement path 92 is displaced from the movement path 91.

Figure 24:
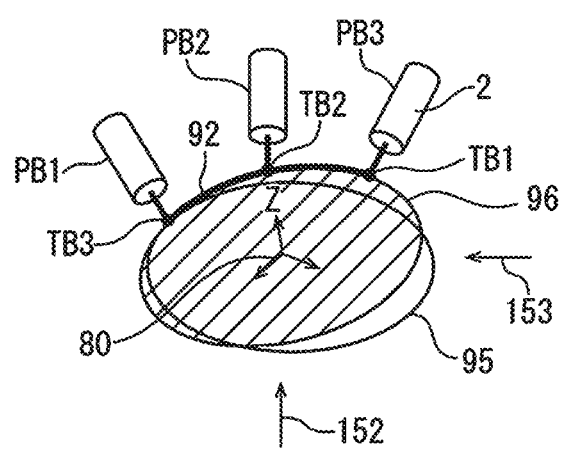
FIG. 24 is a perspective view for explaining a reference direction according to the second reference example.

FIG. 24 is a perspective view for explaining the reference direction according to the second reference example. The movement path 92 is inclined with respect to the horizontal direction. The reference direction is set based on the plane 96 passing through the movement points TB1, TB2, and TB3. The normal direction of the plane 96 is set as the reference direction. The reference direction setting unit 51 sets the reference coordinate system 80 on the plane 96. The reference direction setting unit 51 sets the Z-axis direction of the reference coordinate system 80 as the reference direction. Referring to FIG. 23 and FIG. 24, the movement path 92 is inclined with respect to the horizontal direction. Since the plane 96 is inclined with respect to the horizontal direction, the reference direction is deviated from the vertical direction.

Figure 25:
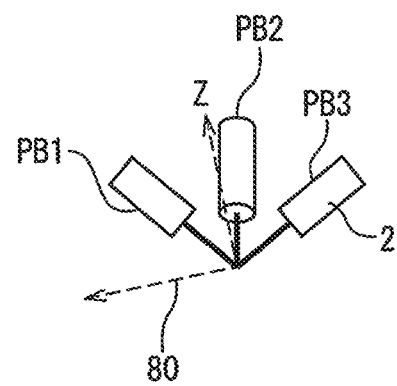
FIG. 25 is a front view for explaining the orientation of the welding torch according to the second reference example.
Figure 26:
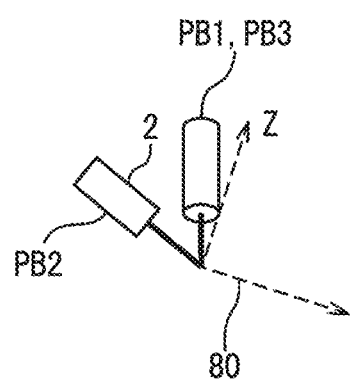
FIG. 26 is a side view for explaining the orientation of the welding torch according to the second reference example.

FIG. 25 is a first view for explaining the orientation of the welding torch at the start point, the via point, and the end point. FIG. 25 is a front view in the direction of the arrow 152 of FIG. 24. FIG. 26 is a second view for explaining the orientation of the welding torch at the start point, the via point, and the end point. FIG. 26 is a side view in the direction of the arrow 153 of FIG. 24. In FIG. 25 and FIG. 26, the tool center point of the welding torch 2 is disposed at the origin of the reference coordinate system 80.

Referring to FIG. 25 and FIG. 26, the Z-axis direction of the reference coordinate system 80 is inclined with respect to the vertical direction. The angle of the welding torch 2 in the axial direction with respect to the reference direction (the elevation angle of the welding torch 2) varies at the position PA1, the position PA2, and the position PA3.

Figure 27:
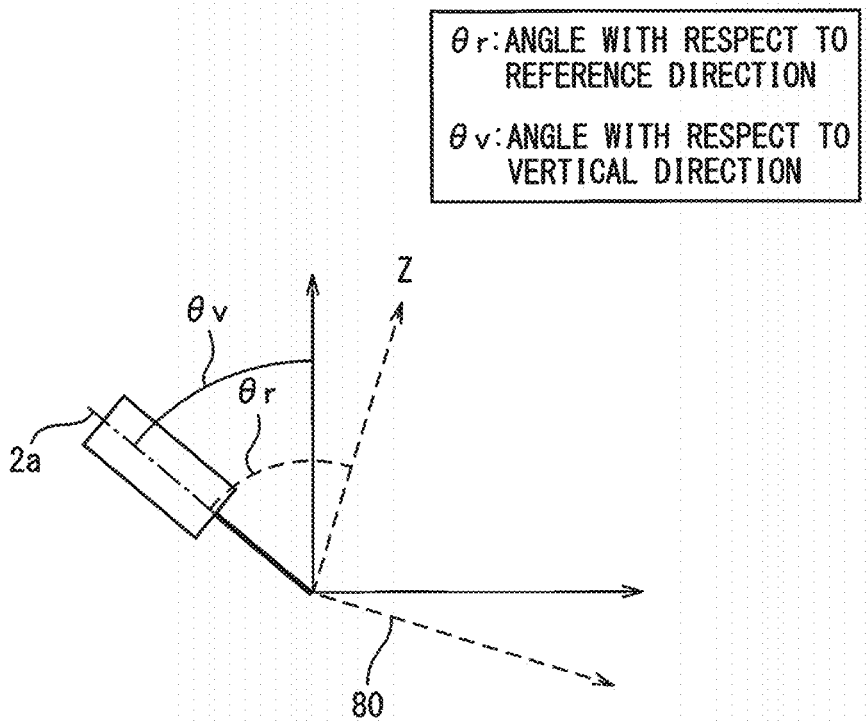
FIG. 27 is an explanatory drawing of an angle with respect to the reference direction and an angle with respect to the vertical direction according to the second reference example.
Figure 28:
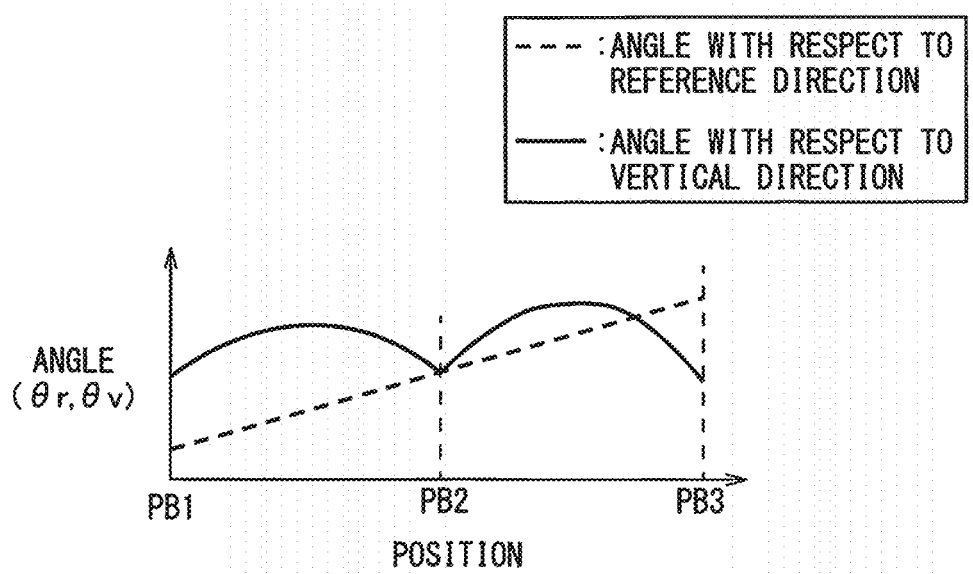
FIG. 28 is a graph showing an angle of the welding torch with respect to the position of the movement point according to the second reference example.

FIG. 27 is an explanatory drawing of the angle of the welding torch with respect to the reference direction or the vertical direction. FIG. 28 is a graph of the angle of the welding torch with respect to the position of the welding torch. Referring to FIG. 27 and FIG. 28, the Z-axis direction of the reference coordinate system 80 serving as the reference direction is inclined with respect to the vertical direction. The angle θr formed by the axis 2a of the welding torch 2 and the reference direction at the position PB2 is larger than the angle θr formed by the axis 2a and the reference direction at the position PB1. Moreover, the angle θr formed by the axis 2a and the reference direction at the position PB3 is larger than the angle θr formed by the axis 2a and the reference direction at the position PB2. The angle formed by the axis 2a of the welding torch 2 and the reference direction gradually increases from the position PB1 to the position PB3.

Also in the second reference example, the interpolation-point angle calculation unit 54 calculates the azimuth angle and the elevation angle of the welding torch 2 at each interpolation point based on the azimuth angle and the elevation angle of the welding torch 2 relating to the reference direction at the movement points TB1, TB2, and TB3. The interpolation-point angle calculation unit 54 calculates the angle of the welding torch 2 relating to the reference direction at the interpolation point by interpolating the angles of the welding torch 2 relating to the reference direction at the movement points TB1, TB2, and TB3.

When the elevation angle of the welding torch 2 at the interpolation point is calculated by this control, as shown in FIG. 28, the angle θv of the axis 2a of the welding torch 2 with respect to the vertical direction fluctuates and does not monotonously increases in a section between the movement points TB1, TB2, and TB3. The angle θv decreases after increasing between the position PB1 and the position PB2. The angle θv decreases after increasing also between the position PB2 and the position PB3.

Figure 29:
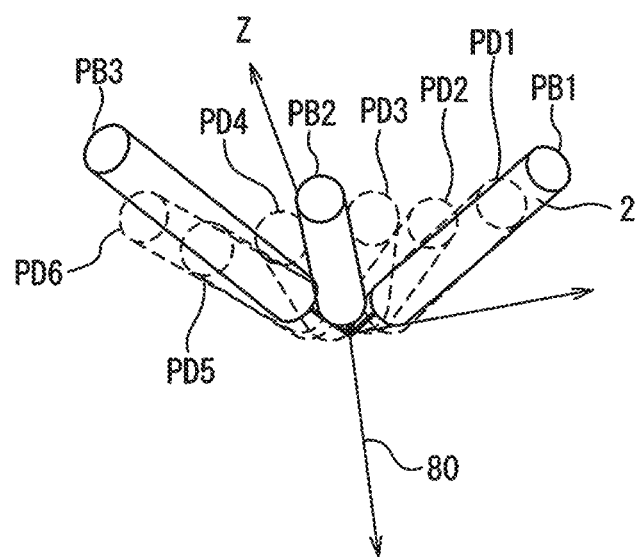
FIG. 29 is a perspective view for explaining the orientation of the welding torch at movement points and interpolation points in the second reference example.
Figure 30:
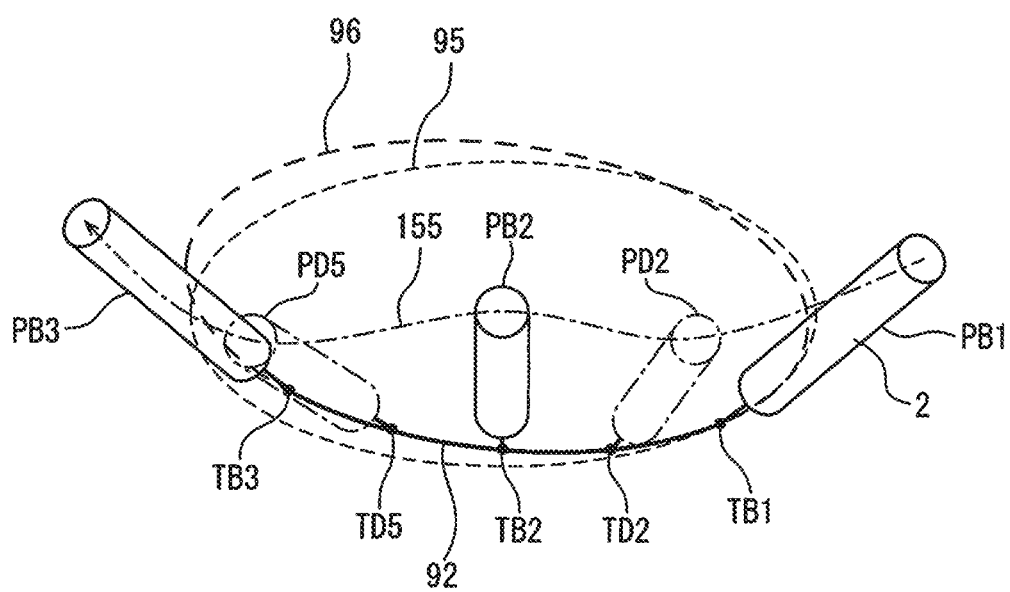
FIG. 30 is another perspective view for explaining the orientation of the welding torch at movement points and interpolation points in the second reference example.

FIG. 29 is a perspective view for explaining the orientation of the welding torch in the second reference example. FIG. 30 is another perspective view for explaining the orientation of the welding torch in the second reference example. Referring to FIG. 29 and FIG. 30, in the second reference example, the welding torch 2 changes in the elevation angle relating to the reference direction in addition to the azimuth angle relating to the reference direction at each of the movement points. Therefore, as indicated by an arrow 155, the locus of predetermined points for the welding torch 2 becomes irregular. In other words, the orientation of the welding torch 2 sways during welding from the position PB1 to the position PB3. Thus, it is necessary to set a large number of teaching points in a teaching operation so as to shorten the intervals between the teaching points.

As described above, if the normal direction of the plane passing through the start point, the via point, and the end point is set as the reference direction in an arc motion, the orientation of the welding torch may sway in a section between the movement points. If the orientation of the welding torch sways in a welding period, the quality of welding may be deteriorated.

Referring to FIG. 5, in the control of the present embodiment, the reference coordinate system 78 is set regardless of the plane 96 passing through the movement points TB1, TB2, and TB3. Referring to FIG. 10 and FIG. 11, even if the operator corrects the positions of the movement points, the unstableness of the welding torch 2 among the movement points TB1, TB2, and TB3 can be suppressed. Alternatively, even if the elevation angle relating to the reference direction varies at the movement points, the unstableness of the orientation of the welding torch can be suppressed in a section between the movement points. Therefore, when the operator corrects the positions of the movement points, an operation can be performed with the stable orientation of the operation tool.

Thus, it is not necessary for the operator to set a large number of teaching points in a teaching operation, whereby working efficiency is improved. The operator can separately set the positions of the teaching points and the reference direction relating to the orientation of the operation tool. Thus, the operator can easily set the teaching points and thus the working efficiency of a teaching operation is improved. For example, the reference direction set by the operator is not changed even if the positions of the teaching points are corrected. The operator can correct the orientation of the operation tool by correcting the reference direction. The operator in particular cannot view the plane determined by the start point, the via point, and the end point. Thus, it is difficult to estimate the orientation of the operation tool between the movement points. In the control of the present embodiment, however, the reference direction is fixed and thus the orientation of the operation tool can be easily estimated between the movement points.

Furthermore, in the control of the present embodiment, a command for setting the reference direction is inserted into the operation program, thereby the reference direction can be changed easily. For example, in one operation program, control may be performed so as to set the reference direction that is the normal direction of the plane passing through the start point, the via point, and the end point of the first reference example and the second reference example and control may be performed to set the reference direction of the present embodiment regardless of the positions of the three points.

A second robot device including a machine for moving workpieces will be described below. In the foregoing embodiment, the workpieces 81 and 82 are fixed to the pedestal 89. In other words, the workpieces 81 and 82 are not movable. The control of the present embodiment is not limited to this configuration. The present embodiment is applicable to a robot device including a machine for moving a workpiece. The robot and the machine are formed so as to operate in cooperation with each other. In the present embodiment, a positioner for rotating a workpiece will be described as a machine that operates in cooperation with a robot.

Figure 31:
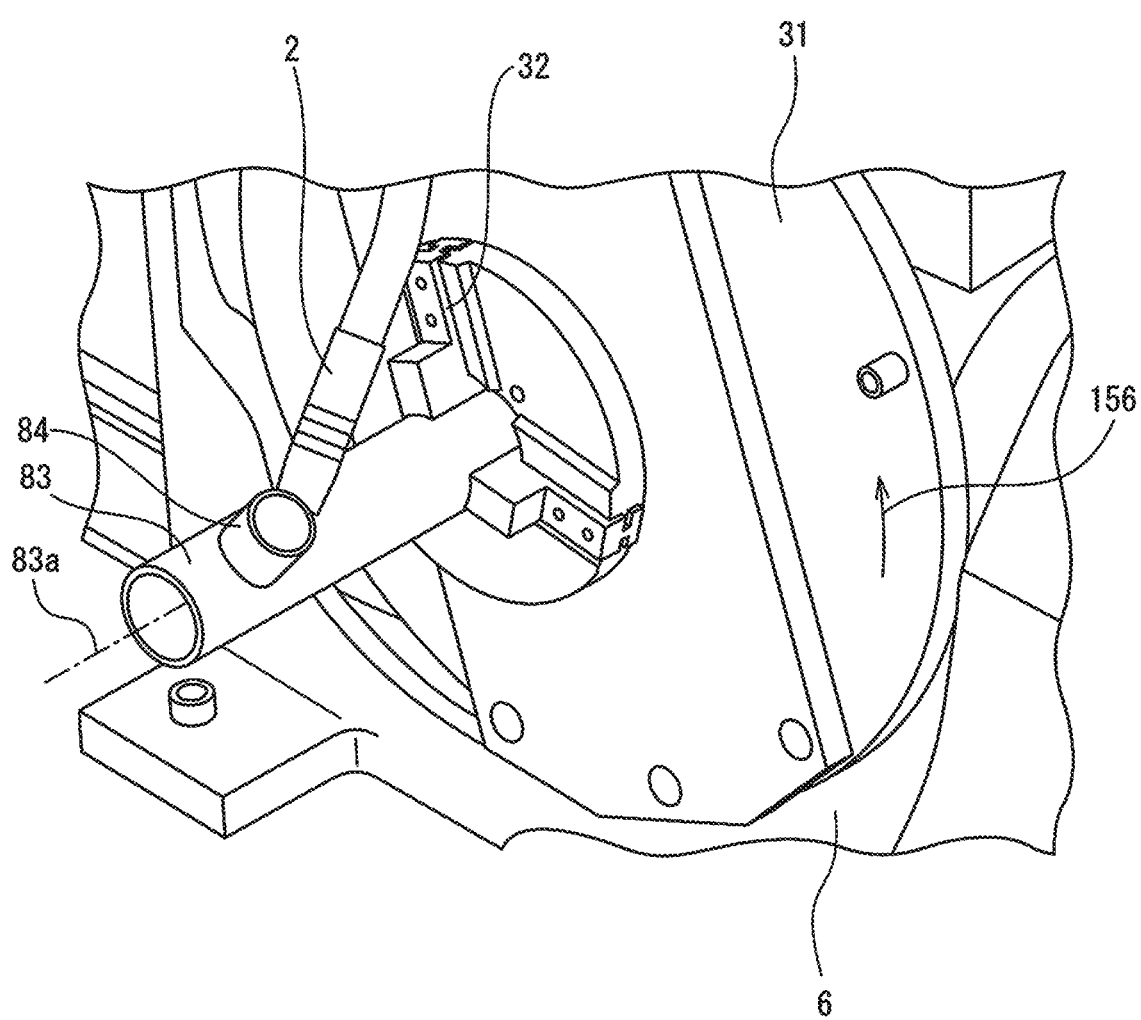
FIG. 31 is a first enlarged perspective view showing a positioner of a second robot device and workpieces according to the embodiment.

FIG. 31 is a first enlarged perspective view of a part that holds the workpiece in the positioner according to the present embodiment. The second robot device 10 of the present embodiment includes a positioner 6 in addition to the robot 1. The positioner 6 includes a chuck 32 for gripping a workpiece 83. In the example of FIG. 31, the workpiece 83 is a cylindrical member. In first control performed by the second robot device 10, a cylindrical workpiece 84 is fixed to the workpiece 83 by welding. The positioner 6 includes a rotation plate 31 that supports the chuck 32. The rotation plate 31 rotates in the direction of an arrow 156. The rotation plate 31 rotates so as to rotate the workpiece 83 about an axis line 83a of the workpiece 83.

Figure 32:
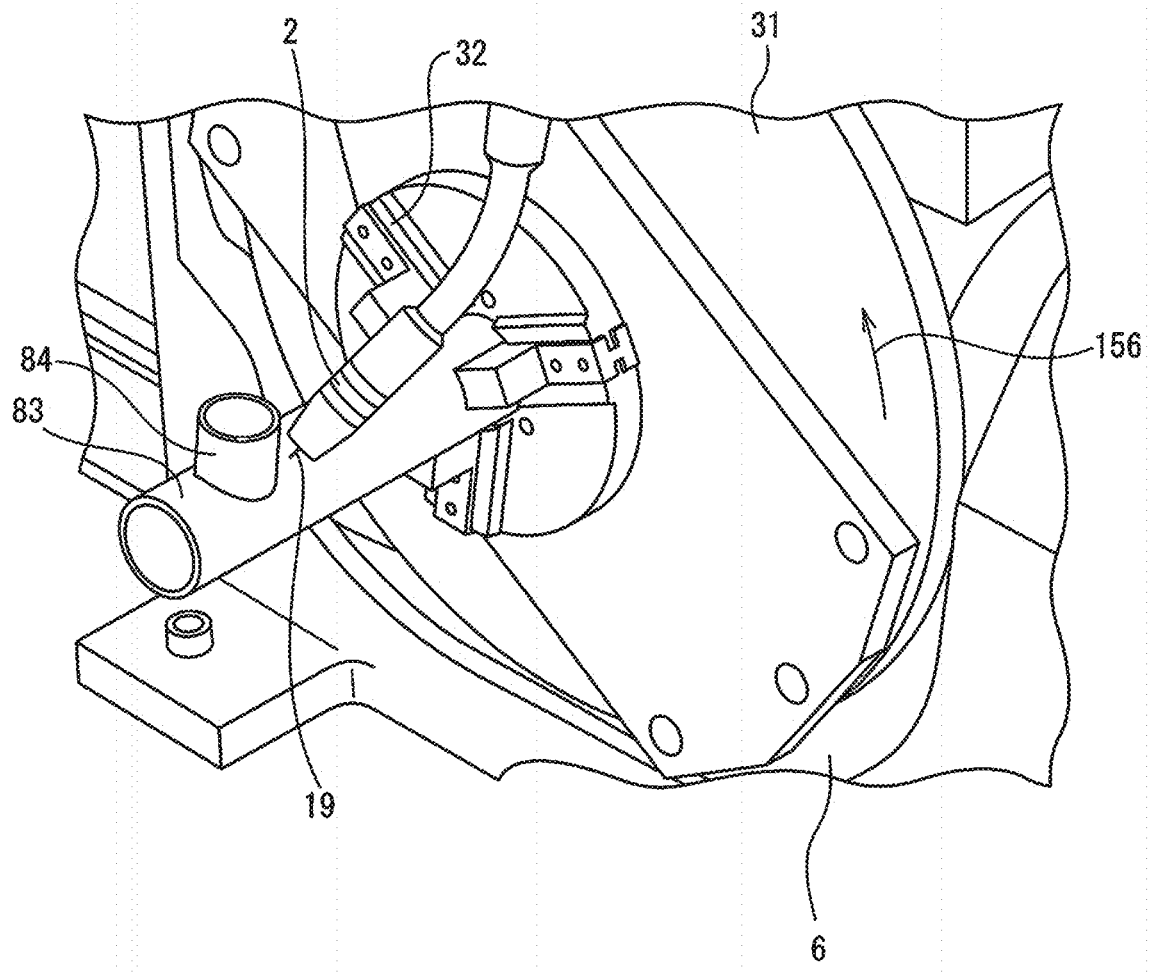
FIG. 32 is a second enlarged perspective view showing the positioner of the second robot device and the workpieces.
Figure 33:
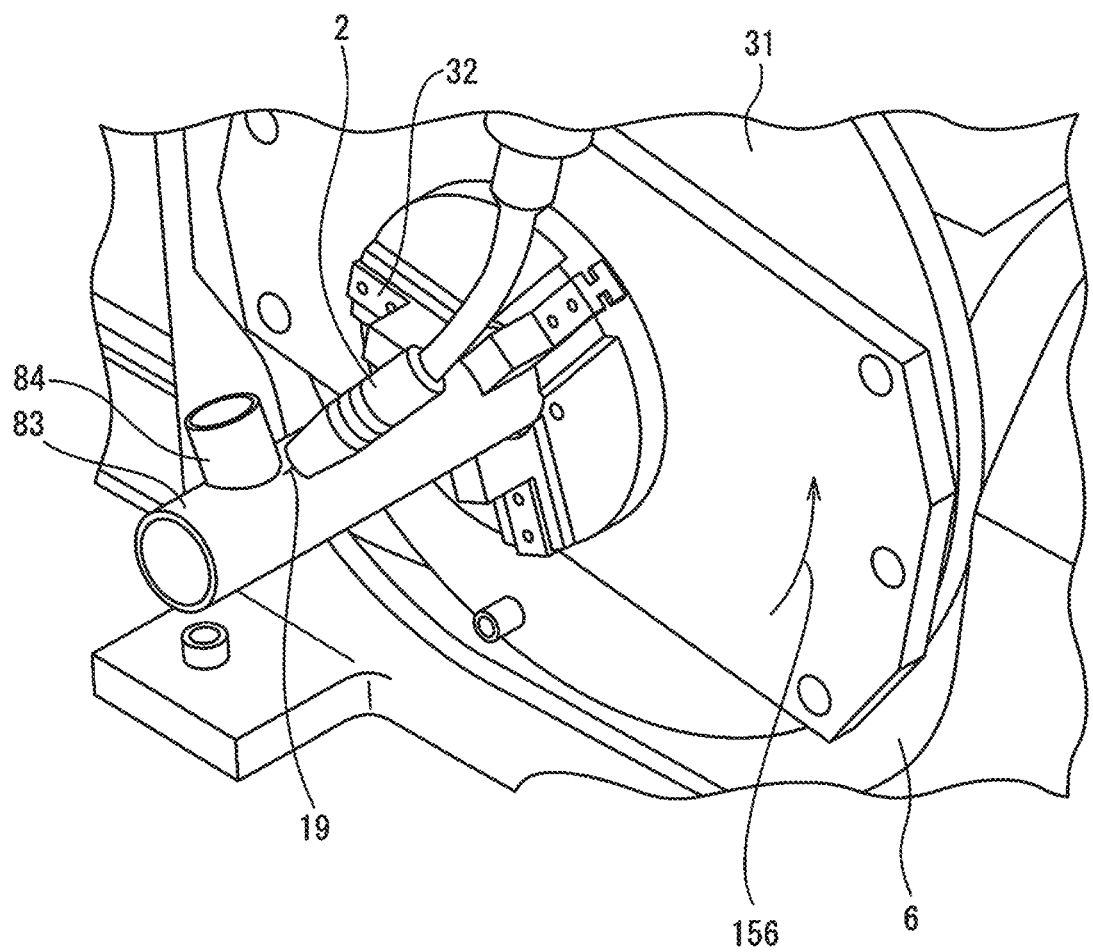
FIG. 33 is a third enlarged perspective view showing the positioner of the second robot device and the workpieces.

FIG. 32 is a second enlarged perspective view of a part of the positioner that holds the workpiece. FIG. 33 is a third enlarged perspective view of a part of the positioner that holds the workpiece. FIGS. 31 to 33 show the orientation of the workpiece 83 being welded and the position and orientation of a welding torch 2 with the elapse of time. In a welding period, the rotation plate 31 rotates in the direction of the arrow 156. In response to the rotating operation of the workpiece 84, the position and orientation of the robot 1 are changed so that the welding torch 2 faces a welded part.

Figure 34:
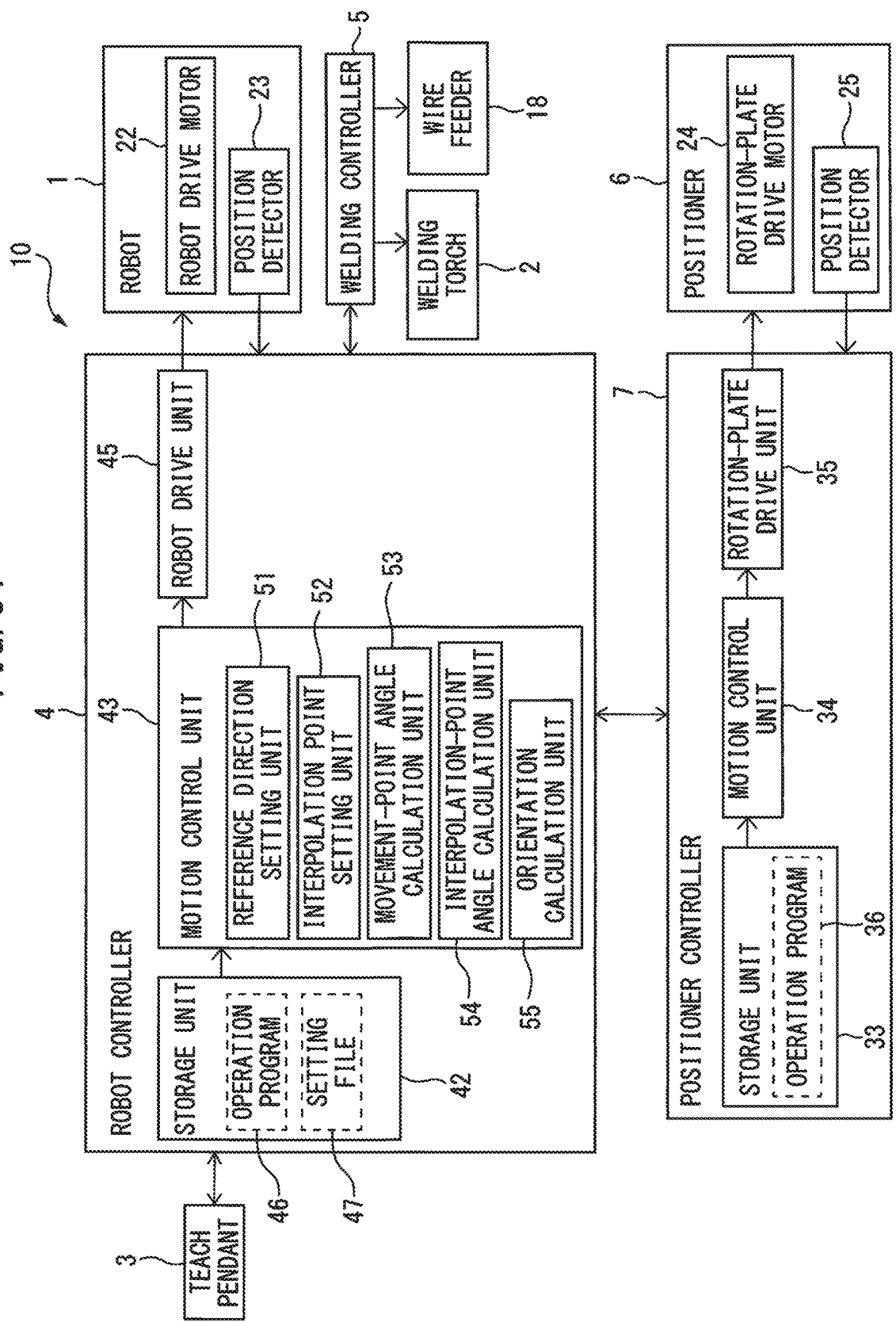
FIG. 34 is a block diagram showing the second robot device.

FIG. 34 is a block diagram showing the second robot device according to the present embodiment. In the second robot device 10, the configuration of a robot controller 4, the configuration of a robot 1, the configuration of a welding controller 5, the configuration of the welding torch 2, and the configuration of a wire feeder 18 are identical to those of the first robot device 9 (see FIG. 2).

The second robot device 10 includes the positioner 6 and a positioner controller 7 acting as a machine controller for controlling the positioner 6. The positioner 6 includes a drive device that has a rotation plate drive motor 24 for driving the rotation plate 31. The positioner 6 includes a position detector 25 for detecting the rotation position of the rotation plate 31. The output of the position detector 25 is transmitted to the positioner controller 7.

The positioner controller 7 includes an arithmetic processing device (computer) including a CPU as a processor, RAM, and ROM. The positioner controller 7 includes a storage unit 33 that stores information on the control of the positioner 6. The storage unit 33 may be constituted by a storage medium such as a volatile memory, a nonvolatile memory, or a hard disk that is capable of storing information. An operation program 36 is stored in the storage unit 33. The processor acting as a motion control unit 34 is formed so as to read information stored in the storage unit 33.

The positioner controller 7 includes the motion control unit 34 that transmits a motion command of the positioner 6 based on the operation program 36. The motion control unit 34 is equivalent to a processor driven according to the operation program 36. The processor reads the operation program 36 and performs control as determined in the operation program 36, so that the processor acts as the motion control unit 34.

The positioner controller 7 includes a rotation plate drive unit 35 including a power supply that supplies electricity to the rotation plate drive motor 24. The rotation plate drive unit 35 supplies electricity to the rotation plate drive motor 24 based on the command from the motion control unit 34. The positioner controller 7 is formed so as to communicate with the robot controller 4. The robot controller 4 receives the rotation position of the rotation plate 31 from the positioner controller 7 and controls the position and orientation of the robot 1. Alternatively, the positioner controller 7 may control the rotation position of the rotation plate 31 in response to a command from the robot controller 4.

Figure 35:
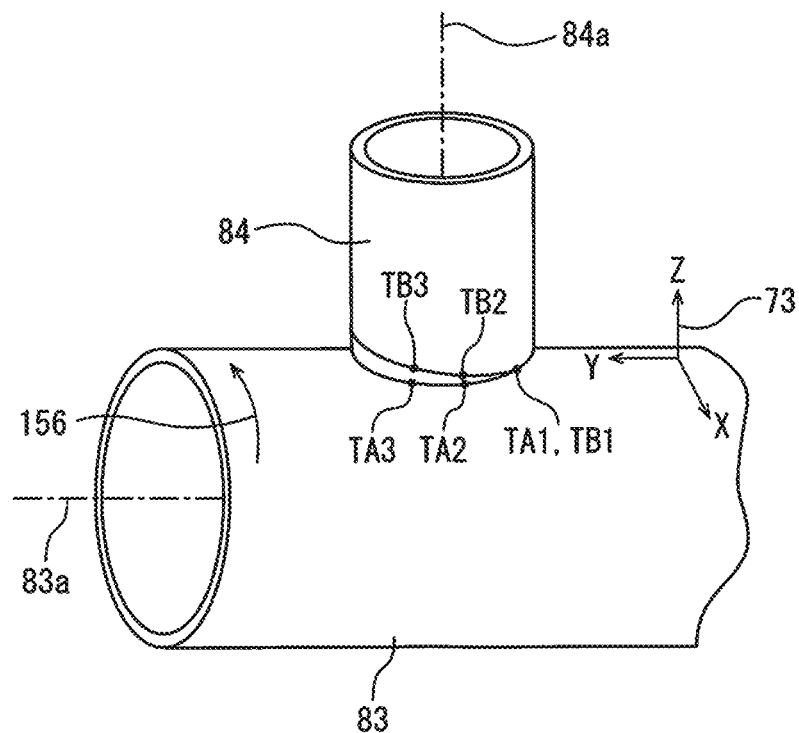
FIG. 35 is an enlarged perspective view of the workpieces under first control in the second robot device.

FIG. 35 is an enlarged perspective view of the workpieces to be welded by the first control of the second robot device. On the surface of the workpiece 83, a leader coordinate system 73 is set. The leader coordinate system 73 is a coordinate system that is set when a motion is performed in a cooperative manner. The leader coordinate system 73 is fixed on the workpiece 83 and moves with the workpiece 83. The origin of the leader coordinate system 73 can be set at any position on the workpiece 83. In the present embodiment, the origin of the leader coordinate system 73 is disposed on the surface of the workpiece 83. The leader coordinate system 73 of the present embodiment is disposed such that the Z-axis direction is parallel with the direction of an axis line 84a of the workpiece 84.

In a teaching operation, an operator can set movement points in the operation program while adjusting the position and orientation of the robot 1 and the rotation position of the positioner 6. For example, the operator can set movement points TA1, TA2, and TA3 according to a teaching operation.

For the reference direction for determining the orientation of the welding torch 2, the same method can be used as in the first reference example. In the leader coordinate system 73, the normal direction of a plane passing through the movement points TA1, TA2, and TA3 can be set as a reference direction. The elevation angle of the welding torch 2 relating to the reference direction remains the same at the moving positions TA1, TA2, and TA3. In this case, the orientation of the welding torch 2 does not sway in a section between the movement points.

However, the operator may change the positions of the movement points TA1, TA2, and TA3 to the positions of movement points TB1, TB2, and TB3. In this case, the orientation of the welding torch 2 may sway in a section between the movement points if the normal direction of a plane passing through the movement points TB1, TB2, and TB3 is set as a reference direction. In such a case, arc motion control can be performed according to the present embodiment.

Steps until the generation of the operation program are similar to those of the first robot device 9 of the present embodiment. The operator sets the position and orientation of the robot 1 and the rotation position of the positioner 6 at the movement point TB1 serving as the start point, the movement point TB2 serving as the via point, and the movement point TB3 serving as the end point in an arc motion.

The operator sets the reference direction for an arc motion in the operation program. In this example, the reference direction is set in the leader coordinate system 73. The operator sets the Z-axis direction of the leader coordinate system 73 as the reference direction. In other words, the extending direction of the axis line 84a of the workpiece 84 is set as the reference direction. In the operation program, an arc motion command in which a command for cooperative control is added is described. Furthermore, a command for setting the reference coordinate system includes the coordinate axis of the leader coordinate system 73 for setting the reference direction.

Figure 36:
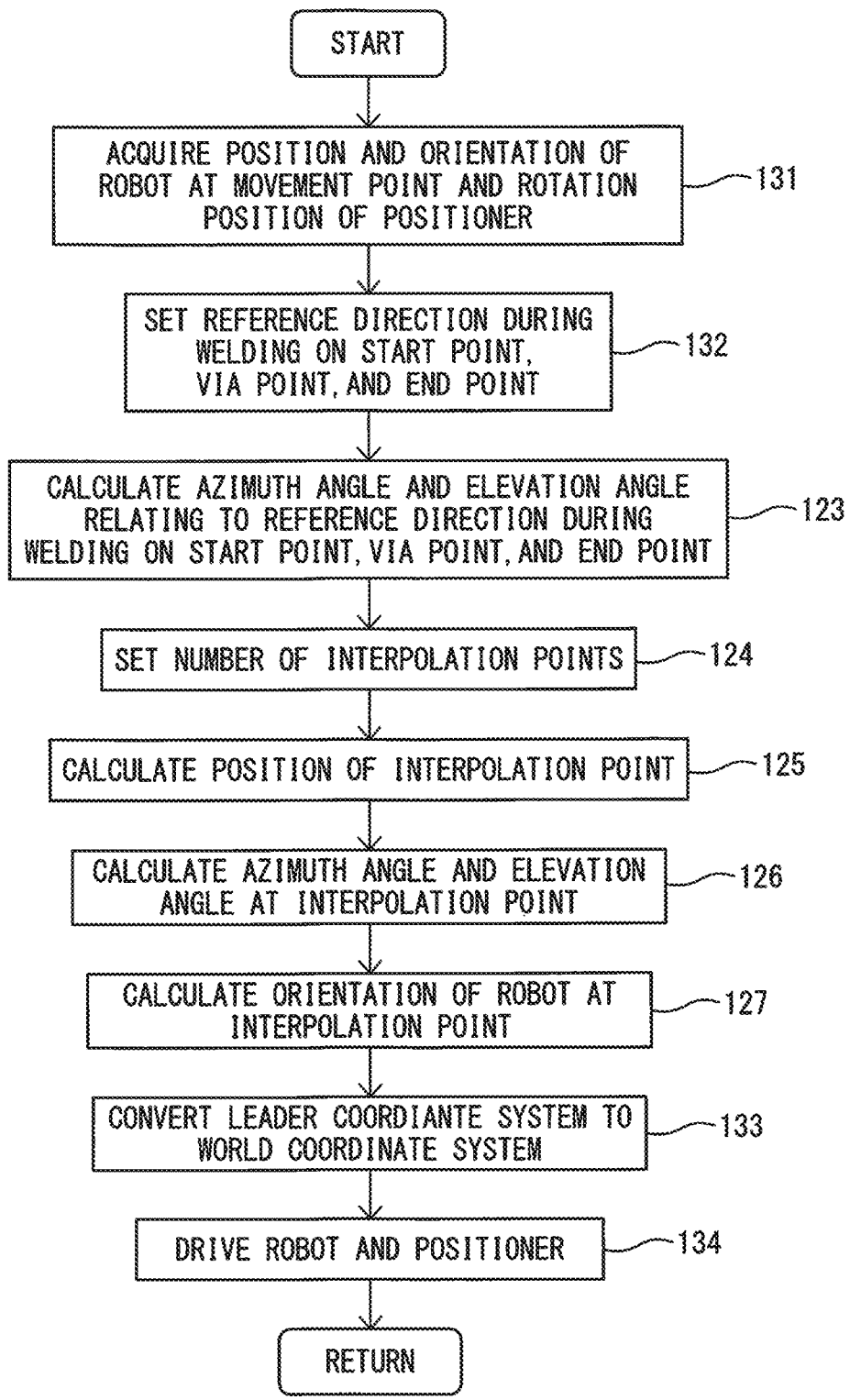
FIG. 36 is a flowchart showing control for welding in the second robot device.

FIG. 36 is a flowchart showing the first control of the second robot device. Referring to FIGS. 34 and 36, the workpieces 83 and 84 are rotated and thus the reference direction rotates with the workpieces 83 and 84 in the second robot device 10. However, the same control as the above-mentioned control can be performed by setting the leader coordinate system 73.

In step 131, the motion control unit 43 of the robot controller 4 acquires the positions and orientations of the robot 1 at the movement points TB1, TB2, and TB3 from the operation program 46. Moreover, the motion control unit 43 acquires the rotation positions of the positioner 6 at the movement points TB1, TB2, and TB3 from the operation program 46.

In step 132, the reference direction setting unit 51 sets the reference direction during welding at the movement point TB1 serving as the start point, the movement point TB2 serving as the via point, and the movement point TB3 serving as the end point. In a welding period, the workpieces 83 and 84 rotate. However, the leader coordinate system 73 also rotates with the workpieces 82 and 83. Thus, the reference direction can be set in the leader coordinate system. The Z-axis direction of the leader coordinate system 73 can be set as the reference direction.

Subsequently, in step 123, a movement-point angle calculation unit 53 calculates the azimuth angle and the elevation angle of the welding torch 2 relating to the reference direction during welding at the start point, the via point, and the end point. The movement-point angle calculation unit 53 calculates the azimuth angle and the elevation angle relating to the reference direction in the leader coordinate system 73. In step 124, the interpolation point setting unit 52 sets the number of interpolation points.

Thereafter, in step 125, the interpolation point setting unit 52 calculates an arc-shaped movement path passing through the movement points TB1, TB2, and TB3. The interpolation point setting unit 52 calculates the position of the interpolation point on the movement path by interpolating the positions of the movement points TB1, TB2, and TB3. The interpolation point setting unit 52 calculates the position of the interpolation point in the leader coordinate system 73.

In step 126, the interpolation-point angle calculation unit 54 calculates, in the leader coordinate system 73, the angle of the welding torch 2 relating to the reference direction at interpolation point. Specifically, the interpolation-point angle calculation unit 54 calculates, in the leader coordinate system 73, the azimuth angle and the elevation angle of the welding torch 2 at the interpolation point. Subsequently, in step 127, the orientation calculation unit 55 calculates, in the leader coordinate system 73, the orientation of the robot 1 at the interpolation point based on the azimuth angle and the elevation angle of the welding torch 2 at the interpolation point.

In step 133, the orientation calculation unit 55 converts the position and orientation of the robot 1 determined in the leader coordinate system 73 at the movement point and the interpolation point to the position and orientation of the robot 1 determined in the world coordinate system 71. The orientation calculation unit 55 can convert the coordinate value of the leader coordinate system 73 to the coordinate value of the world coordinate system 71 based on the relative position and relative orientation of the leader coordinate system 73 with respect to the world coordinate system 71 at the movement point and the interpolation point.

In step 134, the motion control unit 43 drives the robot 1 and the positioner 6. The motion control unit 43 controls the robot 1 based on the position and orientation of the robot 1 determined in the world coordinate system 71. Moreover, the motion control unit 43 controls the rotation position of the positioner 6 via the positioner controller 7.

As described above, when the robot operates in cooperation with the machine for moving the workpiece, the reference direction setting unit sets the reference direction at the interpolation point according to the rotation of the workpiece. Subsequently, the orientation of the robot can be calculated at the interpolation point based on the reference direction.

Figure 37:
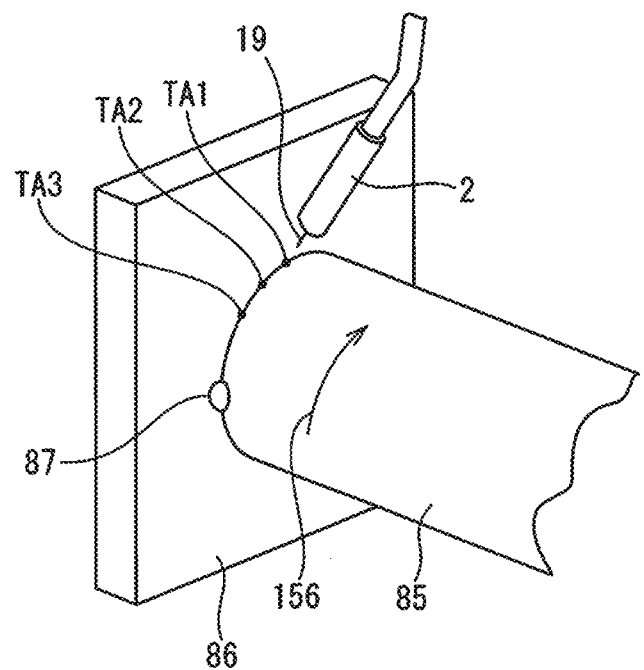
FIG. 37 is an enlarged perspective view of the workpieces and the welding torch under second control in the second robot device.

The second control of the second robot device according to the present embodiment will be described below. FIG. 37 is a first enlarged perspective view of workpieces and the welding torch in the second control. In the second control, a flat-shaped workpiece 86 is welded to the end face of a cylindrical workpiece 85.

The workpiece 85 is supported by the positioner 6. Movement points TA1, TA2, and TA3 are set according to, for example, a teaching operation. The positioner 6 rotates the workpiece 85 in the direction of an arrow 156 in a welding period. If a section between the movement points TA1, TA2, and TA3 is welded, the position and orientation of the welding torch 2 are kept constant. In other words, the positioner 6 rotates the workpiece 85 without changing the position and orientation of the robot 1, whereby the welding is performed along a movement path including the movement points TA1, TA2, and TA3.

When the two workpieces 85 and 86 are fixed by welding, it is necessary to first perform preliminary welding at the contact points of the two workpieces 85 and 86. By adopting this operation, the relative position of the two workpieces 85 and 86 is fixed. Subsequently, main welding is performed after the preliminary welding. The preliminary welding is performed so as to form a welded part 87.

Figure 38:
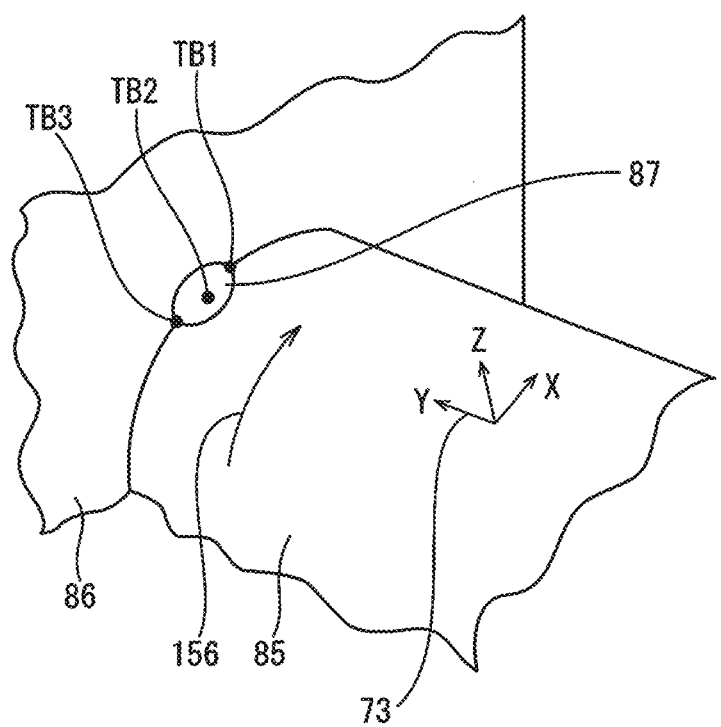
FIG. 38 is an enlarged perspective view of the workpieces under the second control in the second robot device.
Figure 39:
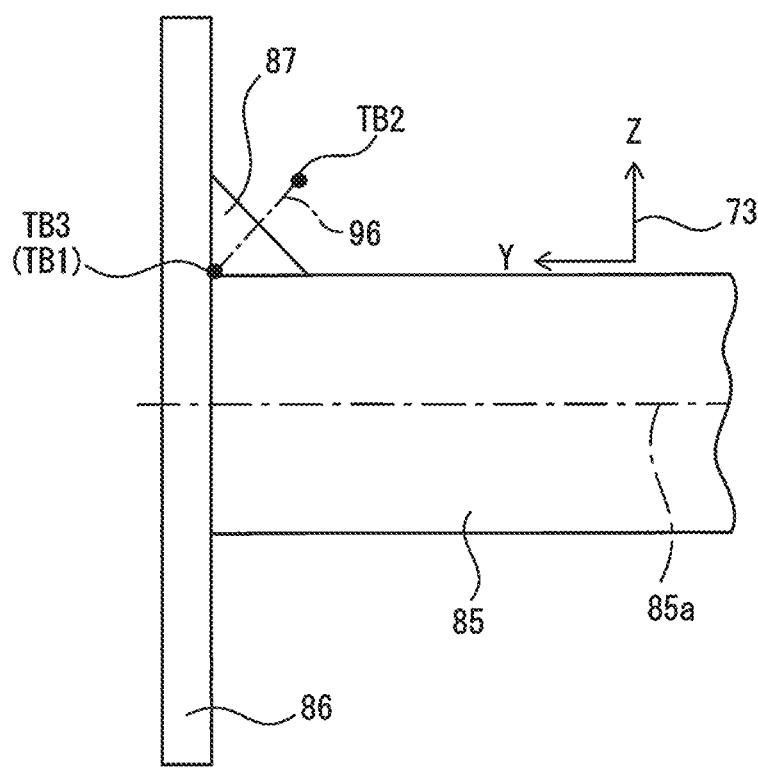
FIG. 39 is a side view of the workpieces under the second control in the second robot device.

FIG. 38 shows an enlarged perspective view of the welded part that is generated by preliminary welding. FIG. 39 is a side view of the welded part that is formed by preliminary welding. FIG. 39 is a side view from the negative side of the X-axis direction of a leader coordinate system 73 in FIG. 38. The workpieces 85 and 86 are rotated by the positioner 6 about an axis line 85a of the workpiece 85 that extends in the horizontal direction. The welded part 87 is formed on the movement path of a tool center point. The welded part 87 is formed so as to project from the movement path. Thus, in the main welding, it is necessary to set the movement points so as to avoid the welded part 87. For example, it is necessary to perform welding along the outer edge of the welded part 87. In this case, it is necessary to change the position and orientation of the robot 1 and the control of the present embodiment can be performed.

In the second control of the second robot device, the operator can use the world coordinate system 71 as a coordinate system for setting the reference direction during an arc motion. In the present embodiment, the world coordinate system 71 is disposed such that the Z-axis direction is parallel with the vertical direction. A user coordinate system may be set instead of the world coordinate system 71. Moreover, the operator can set the leader coordinate system 73 on the surface of the workpiece 85 as a coordinate system for calculating the position of an interpolation point.

A movement point TB1 serving as a start point, a movement point TB2 serving as a via point, and a movement point TB3 serving as an end point are set around the welded part 87. If a plane passing through the movement points TA1, TA2, and TA3 in FIG. 37 serves as a reference plane, the reference plane is parallel with the surface of the workpiece 86. In this case, even if a direction perpendicular to the reference plane is set as the reference direction, the orientation of the welding torch 2 does not sway in a section between the movement points. However, if the reference plane is set to a plane 96 passing through the movement points TB1, TB2, and TB3 around the welded part 87 in FIG. 38 and FIG. 39, the reference plane is inclined with respect to the surface of the workpiece 86. Therefore, if a direction perpendicular to the reference plane is set as the reference direction, the orientation of the welding torch 2 may become unstable.

For this reason, in the second control, the operator can set a reference direction independent from the movement points TB1, TB2, and TB3 in order to perform an arc motion. The Z-axis direction of the world coordinate system 71 can be set as the reference direction. In the second control, the reference direction does not rotate when the workpieces 85 and 86 are rotated by the positioner 6. The arc motion command in which a command for a cooperative motion is added is described in the operation program. The reference direction for an arc motion is set in the operation program.

Referring to FIG. 36, the same control as the first control can be performed in the second control. In the second control, in order to calculate the orientation of the welding torch 2, the same control as the first control can be performed by using the world coordinate system 71 instead of the leader coordinate system.

In step 132, the reference direction setting unit 51 acquires the reference direction set by the world coordinate system 71. In step 123, the movement-point angle calculation unit 53 calculates, in the world coordinate system 71, the azimuth angle and the elevation angle of the welding torch 2 relating to the reference direction when the welding is performed at the start point, the via point, and the end point.

In step 125, the interpolation point setting unit 52 calculates the position of the interpolation point on the movement path by interpolating the positions of the movement points TB1, TB2, and TB3. At this point, the interpolation point setting unit 52 calculates the position of the interpolation point in the leader coordinate system 73.

In step 126, the interpolation-point angle calculation unit 54 calculates, in the world coordinate system 71, the angle of the welding torch 2 relating to the reference direction at interpolation points. Specifically, the azimuth angle and the elevation angle of the welding torch 2 at the interpolation point are calculated in the world coordinate system 71. In step 127, the orientation calculation unit 55 calculates, in the world coordinate system 71, the orientation of the robot 1 at the interpolation point based on the angle of the welding torch 2 at the interpolation point.

In step 133, the orientation calculation unit 55 converts the position of the interpolation point (the position of the robot 1) determined in the leader coordinate system 73 to the position of the interpolation point (the position of the robot 1) determined in the world coordinate system 71. The motion control unit 43 controls the robot 1 based on the determined position and orientation of the robot 1 in the world coordinate system 71. Other kinds of control are similar to the first control.

In this way, the control of the present embodiment is applicable to control for a cooperative motion of a robot and a machine for rotating a workpiece. The first control and the second control of the second robot device can suppress irregularity in the orientation of the operation tool between the movement points as in the case of the first robot device.

In a cooperative motion, the machine for gripping the workpiece is driven in synchronization with the robot. In a cooperative motion of the present embodiment, the reference direction is disposed on the workpiece. Alternatively, the reference direction is fixed. As in the reference example, if a direction perpendicular to a plane passing through the start point, the via point, and the end point is set as the reference direction, the reference direction greatly changes. Thus, it is difficult to estimate the orientation of the operation tool in a section between the movement points. In the present embodiment, however, the reference direction is set regardless of the position of the movement point and thus the orientation of the robot can be easily estimated between the movement points.

In the case of the cooperative motion, at least one of the position and orientation of the robot at the interpolation point is preferably calculated by using the leader coordinate system. By adopting this control, the control of an arc motion according to the present embodiment can be performed easily.

In the foregoing embodiment, the positioner is described as a machine that operates in cooperation with the robot, but the embodiment is not limited to this. The machine that operates in cooperation with the robot may be any machine for moving the workpiece. For example, the machine for moving the workpiece may be a robot. Also in the case of a cooperative motion of two robots, the same control can be performed.

Other configurations, actions, and effects of the second robot device are identical to those of the first robot device of the present embodiment and thus the explanation thereof is not repeated.

The robot of the present embodiment includes six drive axes, but the embodiment is not limited to this. A robot that changes its position and orientation with any mechanism may be used. The operation tool of the present embodiment is a welding torch for welding, but the embodiment is not limited to this. The operator can select an operation tool according to an operation performed by the robot device. For example, the operation tool may be an operation tool for applying adhesive or an operation tool for cutting a workpiece with a laser beam.

An aspect of the present disclosure can provide a robot controller that suppresses the unstableness of an operation tool when a robot performs an arc motion.

In the forgoing control, the order of steps can be optionally changed as long as the functions and effects are not modified.

The foregoing embodiment can be optionally combined with another. In the drawings, the same or equivalent parts are indicated by the same reference numerals. The foregoing embodiment is merely exemplary and does not limit the invention. The embodiment includes the modifications described in the claims.

The invention claimed is:

1. A robot controller for controlling an arc motion of a robot, the robot controller comprising:
 a storage unit storing an operation program for determining a position and orientation of the robot at a predetermined movement point of a plurality of movement points;
 an interpolation point setting unit configured to set an interpolation point between the plurality of movement points;
 a movement-point angle calculation unit configured to calculate, based on the orientation of the robot, an angle relating to a reference direction at the predetermined movement point;
 an interpolation-point angle calculation unit configured to calculate an angle relating to the reference direction at the interpolation point by interpolating angles relating to the reference direction at the plurality of movement points; and
 an orientation calculation unit configured to calculate the orientation of the robot at the interpolation point based on the angle relating to the reference direction at the interpolation point, wherein the reference direction is a direction independent from positions of the plurality of movement points and is set in the operation program in a predetermined coordinate system, and the robot controller is configured to drive the robot to the interpolation point with the orientation calculated by the orientation calculation unit.

2. The robot controller according to claim 1, wherein the reference direction is specified by a coordinate value inputted by an operator into the operation program in the predetermined coordinate system.

3. The robot controller according to claim 1, wherein the reference direction is a direction determined by moving the robot by an operator during a teaching operation for determining the plurality of movement points of the robot.

4. The robot controller according to claim 1, wherein the angle relating to the reference direction is an azimuth angle and an elevation angle of an operation tool with respect to the reference direction.

5. The robot controller according to claim 1, the robot controller being disposed in a robot device including a machine for moving a workpiece, wherein the robot and the machine are formed so as to operate in cooperation with each other, the reference direction is set in the operation program in a leader coordinate system that moves with the workpiece, the leader coordinate system having an origin fixed on the workpiece, and the interpolation-point angle calculation unit is configured to calculate, in the leader coordinate system, an angle relating to the reference direction at the interpolation point.

6. The robot controller according to claim 1, wherein the interpolation point setting unit is configured to calculate a movement path including the plurality of movement points for the robot to perform the arc motion, and set the interpolation point on the movement path between the plurality of movement points.

7. The robot controller according to claim 1, wherein the reference direction is x-axis direction, y-axis direction, or z-axis direction of the predetermined coordinate system.

8. A robot controller for controlling an arc motion of a robot, the robot controller comprising:

a memory storing an operation program for determining a position and orientation of the robot at a predetermined movement point of a plurality of movement points; and a processor configured to set an interpolation point between the plurality of movement points, calculate, based on the orientation of the robot, an angle relating to a reference direction at the predetermined movement point, calculate an angle relating to the reference direction at the interpolation point by interpolating angles relating to the reference direction at the plurality of movement points, calculate the orientation of the robot at the interpolation point based on the angle relating to the reference direction at the interpolation point, wherein the reference direction is a direction independent from positions of the plurality of movement points and is set in the operation program in a predetermined coordinate system, and drive the robot to the interpolation point with the calculated orientation.

* * * * *